(12) United States Patent
Yoshida

(10) Patent No.: US 6,195,468 B1
(45) Date of Patent: Feb. 27, 2001

(54) ERROR-DISTRIBUTING IMAGE CONVERSION METHOD

(75) Inventor: Yasunari Yoshida, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/092,896

(22) Filed: Jun. 8, 1998

(30) Foreign Application Priority Data

Jun. 9, 1997 (JP) .................................................. 9-151023

(51) Int. Cl.[7] ...................................................... G06K 9/40
(52) U.S. Cl. ........................................... 382/270; 382/251
(58) Field of Search ..................................... 382/270–273, 382/251–253

(56) References Cited

U.S. PATENT DOCUMENTS

| 5,045,952 | 9/1991 | Eschbach | 358/447 |
| 5,479,538 | * 12/1995 | Takahashi | 382/270 |
| 5,980,044 | * 11/1999 | Cannon et al. | 353/30 |
| 5,982,940 | * 11/1999 | Sawada | 382/260 |

OTHER PUBLICATIONS

Jarvis, J.F., C.N. Judice, and W.H. Ninke, "A Survey of Techniques for the Display of Continuous Tone Pictures on Bilevel Displays," *Computer Graphics and Image Processing 5*, 1976, pp. 13–40.

Floyd, Robert W. and Louis Steinberg, "An Adaptive Algorithm for Spatial Greyscale," Proceeding of the S.I.D., vol. 17/2, Second Quarter 1976, pp. 75–77.

* cited by examiner

*Primary Examiner*—Thomas D. Lee
*Assistant Examiner*—Stephen Brinich
(74) *Attorney, Agent, or Firm*—Oliff & Berridge, PLC

(57) ABSTRACT

If the subject pixel density I is the minimum density (0), the input conversion portion H1 controls the output conversion portion H4 to output a level of OFF. If the subject pixel density I is the maximum density (255), the input conversion portion H1 controls the output conversion portion H4 to output the other level of ON. The input conversion portion H1 outputs the imaginary density A of one (1) to the input modification portion H2 if the subject pixel density I is the minimum density of zero (0). The input conversion portion H1 outputs the other imaginary density B of 254 to the input modification portion H2 if the subject pixel density I is the maximum density of 255. The conversion portion H3 compares, with the threshold value, a modified value I' supplied from the input modification portion H2. Even in the uniform density region having the density of zero (0) or 255, the comparison judgment attained by the conversion portion H3 will frequently change. The calculation process attained by the binary error generating portion H5 will frequently switch between two types of calculation processes (2) and (3). Uniformity in conversion errors distributed from the error distributing portion H6 to the error storing portion H7 is disturbed. Pixels will be turned On and OFF irregularly, thereby preventing occurrence of undesirable textures.

43 Claims, 12 Drawing Sheets

FIG. 11 (a)

|  | i = −1 | i = 0 | i = 1 | i = 2 |
|---|---|---|---|---|
| j = −1 | − | − | 3/16 | 1/16 |
| j = 0 | − | 8/16 * | 4/16 | − |

~Bmat( )

SUBJECT PIXEL
PIXEL POSITION : (x, y)

FIG. 11 (b)

SUBJECT PIXEL
PIXEL POSITION : (x, y)

|  | i = −1 | i = 0 | i = 1 |
|---|---|---|---|
| j = 0 |  | 8/16 * | 3/16 |
| j = 1 | 1/16 | 3/16 | 1/16 |

~Bmat( )

ERROR-DISTRIBUTING IMAGE CONVERSION METHOD

BACKGROUND OF THE INVENTION

1. Field of the Invention

The present invention relates to a method of converting continuous tone images into pseudo-halftone binary images.

2. Description of Related Art

An error-distributing image conversion method has been proposed to convert a continuous tone image into a pseudo-halftone image with high quality. The continuous tone image is comprised of a plurality of pixels, each pixel having a density defined by one of plural tone levels. The plural tone levels are defined in a density range between a predetermined minimum density and a predetermined maximum density. The error-distributing image conversion method converts this multilevel density value, at each pixel, into one of two levels, ON and OFF, for example. The plurality of pixels, each thus having a density value of either ON or OFF, construct the pseudo-halftone image.

SUMMARY OF THE INVENTION

In one conceivable process of the error-distributing image conversion method, when converting the multilevel density value of one pixel into a bilevel density value, the multilevel density value may be first modified by binary conversion errors distributed from already-processed pixels that are located in a neighborhood of the subject pixel. Then, the modified multilevel density is compared with a predetermined threshold value. In accordance with the compared result, the subject pixel is turned ON or OFF. Then, a binary conversion error is calculated as a difference between the modified multilevel density and a density represented by the determined bilevel value of ON or OFF. That is, when the subject pixel is turned ON, the conversion error is calculated through subtracting the maximum density from the modified multilevel density. When the subject pixel is turned OFF, on the other hand, the conversion error is calculated as equal to the modified multilevel density. The binary conversion error will be fractionally distributed or affected onto pixels, which are located neighboring to the subject pixel and which have not yet been processed.

In order to distribute or affect the binary conversion error to the unprocessed neighboring pixels, there have been proposed various methods, such as an error diffusion method and a minimized average error method.

The error diffusion method has been proposed by Floyd, et al. in "An Adaptive Algorithm for Spatial Greyscale" SID 17 [1976]. According to the error diffusion method, after the subject pixel is converted into a binary value, the generated binary conversion error is fractionally distributed or diffused to neighboring pixels not yet processed. Each fraction of the binary conversion error is accumulated into a conversion error sum to be used for processing a corresponding unprocessed neighboring pixel.

The minimized average error method has been proposed by J. F. Jarvis, C. N. Judice, and W. H. Ninke, in "A Survey of Techniques for the Display of Continuous Tone Pictures on Bilevel Displays", Computer Graphics and Image Processing.5,13–40(1976). According to the minimized average error method, before processing one pixel, the multilevel density of that pixel is added with a sum of fractions of binary conversion errors, which have been generated at already-processed pixels neighboring to the subject pixel. The thus modified multilevel density is converted into the binary value.

The above-described error-distributing image conversion processes can convert a continuous tone image, whose pixels have multilevel densities, into a pseudo-halftone image, whose pixels have bilevel densities. The pseudo-halftone image can be reproduced by a bilevel printer, which is designed to selectively apply an ink dot or not at each pixel location.

The error-distributing image conversion processes, however, induce the problems described below.

It is now assumed that the conceivable error-distributing image conversion process is performed on a pixel by pixel basis onto a continuous tone image D shown in FIG. 1. All the pixels in the continuous tone image D are processed one by one from left to right along each pixel line, i.e., in a main scanning direction x. The pixel lines are processed from top to bottom along the auxiliary scanning direction y. As the pixels are thus proceeded, binary conversion errors are obtained and distributed to unprocessed neighboring pixels. More specifically, each pixel density value is modified by fractions of errors distributed from already-processed neighboring pixels. The modified density is then compared with a predetermined threshold value. Based on the compared result, the pixel density value is converted into a binary value. A binary conversion error generated through the binary conversion process will be affected to neighboring unprocessed pixels.

As shown in FIG. 1, the continuous tone image D has three regions R1, R2, and R3 which are arranged in this order along the auxiliary scanning direction y. Pixels in regions R1, R2, and R3 are subjected to the error-distributing image conversion process in this order.

It is also assumed that density of each pixel in the continuous tone image D is defined in a multilevel density range between zero (0) and 255. The region R1 is a non-uniform density region. Pixels with two or more different densities are distributed non-uniformly in region R1. Contrarily, regions R2 and R3 are uniform density regions. All the pixels in region R2 have the minimum density in the multilevel density range. That is, all the pixels in region R2 have the same density of zero (0). All the pixels in region R3 have the same density of another value greater than zero (0). In this example, all the pixels in region R3 have the same density of one (1).

When this continuous tone image D is converted into a pseudo-halftone image through the conceivable error-distributing binary conversion process, however, the pseudo-halftone image will suffer from undesirable textures occurring in a leading edge S of the region R3. Pixels in leading edge S will be turned On at a regular interval. The thus regularly arranged turned-On pixels create a certain texture to be perceived by human eyes.

A similar phenomenon occurs also when the continuous tone image D is designed so that all the pixels in region R2 have the maximum density (255) in the multilevel density range and so that all the pixels in region R3 have the uniform density of a value lower than 255, for example, 254. When this continuous tone image D is converted into a pseudo-halftone image through the conceivable error-distributing image conversion process, pixels in leading edge S will be turned OFF also at a regular interval, thereby creating undesirable textures.

Accordingly, the pseudo-halftone image obtained based on the continuous tone image D has low quality.

In view of the above-described drawbacks, an object of the present invention is to provide an improved method for converting a continuous tone image into a pseudo-halftone image of high quality while preventing occurrence of undesirable textures in a transition region between a uniform density region having the minimum or maximum density and another uniform density region having a density (middle density) different from the corresponding minimum or maximum density.

In order to attain the above and other objects, the present invention provides a method for converting a continuous tone image into a pseudo-halftone image, the method comprising the steps of: receiving data of a continuous tone image desired to be converted into a pseudo-halftone image, the continuous tone image having a plurality of pixels, each pixel having one density value defined in a range between a predetermined minimum density and a predetermined maximum density; and subjecting all the pixels of the continuous tone image to an error-distributing binary conversion process on a pixel by pixel basis, to thereby convert the density values of the pixels into binary values while calculating conversion errors and distributing the calculated conversion errors to neighboring pixels, while performing at least one of a first compulsive converting process and a second compulsive converting process, the first compulsive converting process being for compulsively converting a minimum density pixel that has the minimum density into a first binary value and calculating a conversion error, to be distributed from the minimum density pixel to its neighboring pixels, through using a first imaginary density, greater than the minimum density, as the density value for the minimum density pixel, the second compulsive converting process being for compulsively converting a maximum density pixel that has the maximum density into a second binary value and calculating a conversion error, to be distributed from the maximum density pixel to its neighboring pixels, through using a second imaginary density, smaller than the maximum density, as the density value for the maximum density pixel.

All the pixels of the continuous tone image may be successively subjected to the error-distributing binary conversion process, while each minimum density pixel being compulsively converted into the first binary value and the conversion error, to be distributed from the minimum density pixel to its neighboring pixels, being calculated through using the fist imaginary density as the density value for the minimum density pixel, and while each maximum density pixel being compulsively converted into the second binary value and a conversion error, to be distributed from the maximum density pixel to its neighboring pixels, being calculated through using the second imaginary density as the density value for the maximum density pixel.

The error-distributing binary conversion step may include the steps of: (a) judging whether or not a pixel to be processed to the error-distributing binary conversion process has the minimum density, the maximum density, or another value different from the minimum density and the maximum density; (b) setting the first imaginary density when the subject pixel has the minimum density, and setting the second imaginary density when the subject pixel has the maximum density; (c) calculating a modified density for the subject pixel, the modified density being calculated, if the subject pixel has the minimum density, through adding the first imaginary density with fractional portions of errors distributed from already-processed pixels neighboring to the subject pixel, the modified density being calculated, if the subject pixel has the maximum density, through adding the second imaginary density with the fractional portions of errors distributed from already-processed pixels neighboring to the subject pixel, the modified density being calculated, if the subject pixel has the density different from the minimum density and the maximum density, through adding the density of the subject pixel with the fractional portions of errors distributed from the already-processed pixels neighboring to the subject pixel; (d) comparing the modified density with a predetermined threshold value; (e) compulsively converting the subject pixel into the first binary value regardless of the compared result when the subject pixel has the minimum density, compulsively converting the subject pixel into the second binary value regardless of the compared result when the subject pixel has the maximum density, converting the subject pixel into the first binary value when the subject pixel has the density different from the minimum density and the maximum density and when the modified density is smaller than the threshold value, and converting the subject pixel into the second binary value when the subject pixel has the density different from the minimum density and the maximum density and when the modified density is equal to or greater than the threshold value; (f) calculating a conversion error, to be distributed from the subject pixel to pixels neighboring to the subject pixel, the conversion error being calculated as equal to the modified density when the modified density is smaller than the threshold value, the conversion error being calculated as a value obtained through subtracting the maximum value from the modified density when the modified density is equal to or greater than the threshold value and when the subject pixel has the density different from the minimum density and the maximum density, the conversion error being calculated as equal to a value obtained through subtracting a value X from the modified density when the modified density is equal to or greater than the threshold value and when the subject pixel has the minimum density, the value X being greater than the first imaginary density and being equal to or smaller than the maximum density, the conversion error being calculated as equal to a value obtained through subtracting a value Y from the modified density when the modified density is equal to or greater than the threshold value and when the subject pixel has the maximum density, the value Y being greater than the second imaginary density and being equal to or smaller than the maximum value; and (g) repeating the steps (a) through (f) for each of all the pixels within the continuous tone image, thereby producing the pseudo-halftone image.

According to another aspect, the present invention provides a device for converting a continuous tone image into a pseudo-halftone image, the device comprising: means for receiving data of a continuous tone image desired to be converted into a pseudo-halftone image, the continuous tone image having a plurality of pixels, each pixel having one density value defined in a range between a predetermined minimum density and a predetermined maximum density; and means for subjecting all the pixels of the continuous tone image to an error-distributing binary conversion process on a pixel by pixel basis, to thereby convert the density values of the pixels into binary values while calculating conversion errors and distributing the calculated conversion errors to neighboring pixels, while performing at least one of a first compulsive converting process and a second compulsive converting process, the first compulsive converting process being for compulsively converting a minimum density pixel that has the minimum density into a first binary value and calculating a conversion error, to be distributed from the minimum density pixel to its neighboring pixels, through using a first imaginary density, greater than the minimum density, as the density value for the minimum density pixel, the second compulsive converting process being for compulsively converting a maximum density pixel that has the maximum density into a second binary value and calculating a conversion error, to be distributed from the maximum density pixel to its neighboring pixels, through using a second imaginary density, smaller than the maximum density, as the density value for the maximum density pixel.

The conversion process means may successively subject all the pixels of the continuous tone image to the error-distributing binary conversion process, while compulsively converting each minimum density pixel into the first binary value and calculating the conversion error, to be distributed from the minimum density pixel to its neighboring pixels, through using the first imaginary density as the density value for the minimum density pixel, and while compulsively converting each maximum density pixel into the second binary value and calculating a conversion error, to be distributed from the maximum density pixel to its neighboring pixels, through using the second imaginary density as the density value for the maximum density pixel.

The conversion process means may include: (a) means for judging whether or not a pixel to be processed to the error-distributing binary conversion process has the minimum density, the maximum density, or another value different from the minimum density and the maximum density; (b) means for setting the first imaginary density when the subject pixel has the minimum density, and setting the second imaginary density when the subject pixel has the maximum density; (c) means for calculating a modified density for the subject pixel, the modified density calculating means calculating the modified density, if the subject pixel has the minimum density, through adding the first imaginary density with fractional portions of errors distributed from already-processed pixels neighboring to the subject pixel, the modified density calculating means calculating the modified density, if the subject pixel has the maximum density, through adding the second imaginary density with the fractional portions of errors distributed from already-processed pixels neighboring to the subject pixel, the modified density calculating means calculating the modified density, if the subject pixel has the density different from the minimum density and the maximum density, through adding the density of the subject pixel with the fractional portions of errors distributed from the already-processed pixels neighboring to the subject pixel; (d) means for comparing the modified density with a predetermined threshold value; (e) means for compulsively converting the subject pixel into the first binary value regardless of the compared result when the subject pixel has the minimum density, for compulsively converting the subject pixel into the second binary value regardless of the compared result when the subject pixel has the maximum density, for converting the subject pixel into the first binary value when the subject pixel has the density different from the minimum density and the maximum density and when the modified density is smaller than the threshold value, and for converting the subject pixel into the second binary value when the subject pixel has the density different from the minimum density and the maximum density and when the modified density is equal to or greater than the threshold value; (f) means for calculating a conversion error, to be distributed from the subject pixel to pixels neighboring to the subject pixel, the conversion error calculating means calculating the conversion error as equal to the modified density when the modified density is smaller than the threshold value, the conversion error calculating means calculating the conversion error as a value obtained through subtracting the maximum value from the modified density when the modified density is equal to or greater than the threshold value and when the subject pixel has the density different from the minimum density and the maximum density, the conversion error calculating means calculating the conversion error as equal to a value obtained through subtracting a value X from the modified density when the modified density is equal to or greater than the threshold value and when the subject pixel has the minimum density, the value X being greater than the first imaginary density and being equal to or smaller than the maximum density, the conversion error calculating means calculating the conversion error as equal to a value obtained through subtracting a value Y from the modified density when the modified density is equal to or greater than the threshold value and when the subject pixel has the maximum density, the value Y being greater than the second imaginary density and being equal to or smaller than the maximum value; and (g) control means for controlling the means (a) through (f) to perform operation onto each of all the pixels within the continuous tone image, thereby producing the pseudo-halftone image.

According to still another aspect, the present invention provides a device for converting a continuous tone image into a pseudo-halftone image, the device comprising: an input conversion portion for receiving input density representing each pixel of the continuous tone image to be converted, the input density being defined in a density range between a minimum density and a maximum density, for judging whether or not the input density is equal to the minimum density or the maximum density, for issuing a first compulsive command to output a first binary value when the input density is judged to be the minimum density and issuing a second compulsive command to output a second binary value when the input density is judged to be the maximum density, for outputting the input density as a density value when the input density is different from the minimum density and the maximum density, for outputting a first imaginary density, greater than the minimum density, as the density value when the input density is equal to the minimum density, and for outputting a second imaginary density, smaller than the maximum density, as the density value when the input density is equal to the maximum density; an input modification portion for calculating a modified density for a subject pixel through adding the density value inputted from the input conversion portion with conversion errors distributed to the subject pixel from already-processed pixels, and for outputting the modified density; a binary conversion portion for comparing the modified density value, inputted from the input modification portion, with a predetermined threshold value, the binary conversion portion issuing a first instruction to output a first binary value if the modified density value is smaller than the threshold value and issuing a second instruction to output a second binary value if the modified density value is greater than or equal to the threshold value; an output conversion portion capable of receiving the first and second compulsive commands from the input conversion portion and capable of receiving the first and second instructions from the binary conversion portion, the output conversion portion outputting the first binary value in response to the first compulsive command regardless of the instruction received from the binary conversion portion, the output conversion portion outputting the second binary value in response to the second compulsive command regardless of the instruction received from the binary conversion portion, the output conversion portion outputting the first binary value when receiving the first instruction and when receiving no compulsive commands from the input conversion portion, the output conversion portion outputting the second binary value when receiving the second instruction and when receiving no compulsive commands from the input conversion portion; and a binary error generating portion for receiving the modified density value from the input modification portion and for receiving the instruction issued from the binary conversion portion, the binary error generating portion calculating a conversion error as equal to the modified density value when receiving the first instruction and calculating a conversion error through subtracting the maximum density from the modified density value when receiving the second instruction.

The binary conversion error generating portion may further receive the compulsive command from the input conversion portion, the binary error generating portion calculating a conversion error through subtracting a value X from the modified density value when receiving the second instruction from the binary conversion portion and receiving the first compulsive command from the input conversion portion, the value X being greater than the first imaginary density and equal to or smaller than the maximum density, the binary error generating portion calculating a conversion error through subtracting a value Y from the modified density value when receiving the second instruction from the binary conversion portion and receiving the second compulsive command from the input conversion portion, the value Y being greater than the second imaginary density and equal to or smaller than the maximum density.

According to a further aspect, the present invention provides a program storage medium capable of being read by a computer, the program comprising: a program of receiving data of a continuous tone image desired to be converted into a pseudo-halftone image, the continuous tone image having a plurality of pixels, each pixel having one density value defined in a range between a predetermined minimum density and a predetermined maximum density; and a program of subjecting all the pixels of the continuous tone image to an error-distributing binary conversion process on a pixel by pixel basis, to thereby convert the density values of the pixels into binary values while calculating conversion errors and distributing the calculated conversion errors to neighboring pixels, while performing at least one of a first compulsive converting process and a second compulsive converting process, the first compulsive converting process being for compulsively converting a minimum density pixel that has the minimum density into a first binary value and calculating a conversion error, to be distributed from the minimum density pixel to its neighboring pixels, through using a first imaginary density, greater than the minimum density, as the density value for the minimum density pixel, the second compulsive converting process being for compulsively converting a maximum density pixel that has the maximum density into a second binary value and calculating a conversion error, to be distributed from the maximum density pixel to its neighboring pixels, through using a second imaginary density, smaller than the maximum density, as the density value for the maximum density pixel.

DETAILED DESCRIPTION OF THE INVENTION

A basic structure of the error-distributing image conversion method of the present invention will be first described in greater detail.

Figure 1:
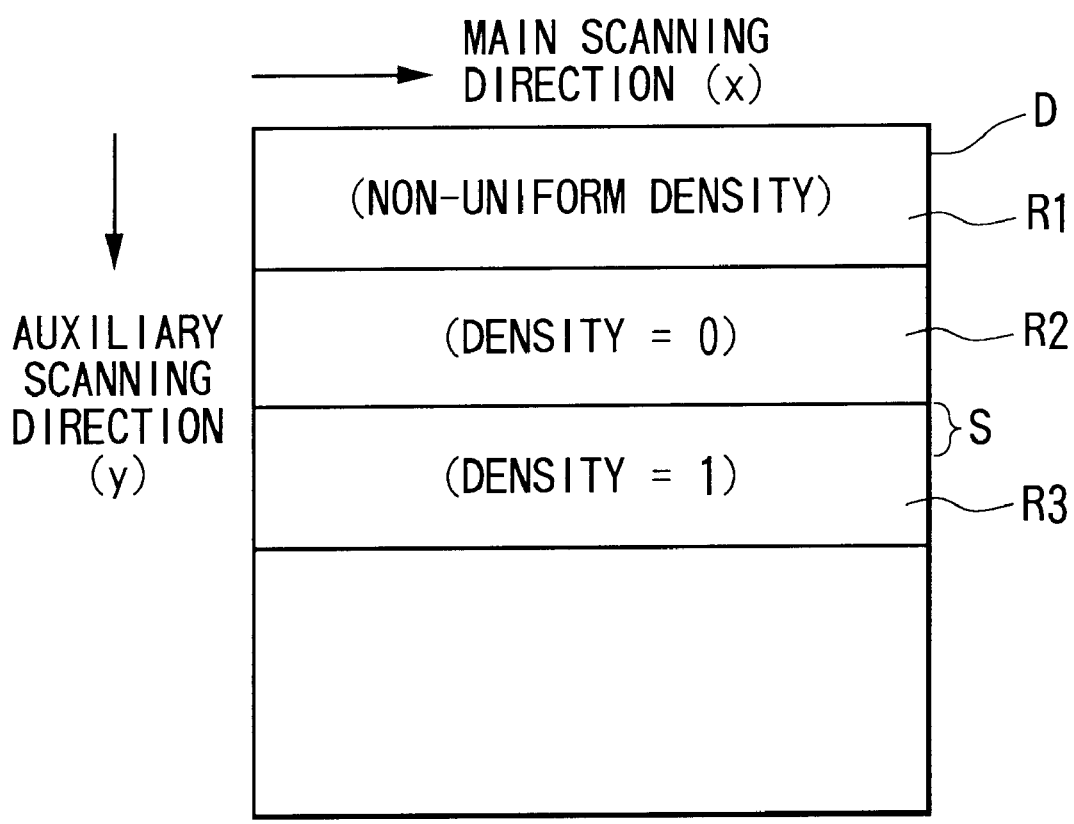
FIG. 1 illustrates a continuous tone image to be converted into a pseudo-halftone image.

It is now assumed that the error-distributing image conversion method of the present invention is performed onto the continuous tone image D of FIG. 1 where all the pixels in region R2 have the minimum density of zero (0) and all the pixels in the region R3 have the density of one (1). According to the method of the present invention, minimum density pixels are compulsively converted into OFF levels. In order to calculate a conversion error to be distributed or affected from each minimum density pixel to its neighboring unprocessed pixels, a first imaginary density A is set in place of the minimum density. The first imaginary density A is defined as greater than the minimum density. The imaginary density A is first added with errors distributed from already-processed pixels neighboring to the subject pixel. Thus, a modified density is obtained for this minimum density pixel. The modified is then compared with the predetermined threshold value.

When the modified density is smaller than the threshold value, a binary conversion error is set as equal to the modified density. When the modified density is equal to or greater than the threshold value, on the other hand, the binary conversion error is set as a value calculated through subtracting a value X from the modified density, where the value X is greater than the first imaginary density A and is equal to or lower than the maximum density. That is, $A<X \leqq 255$ when density of the continuous tone image is defined in the multilevel range of zero (0) to 255.

It is noted that if almost the entire area of the continuous tone image D has non-uniform densities as in region R1, even if the continuous tone image D has some small area having uniform density of some value, pixels in image D will not be converted into ON and OFF levels at any regular intervals even through the conceivable error-distributing image conversion process. A pseudo-halftone image, obtained through the conceivable process, will suffer from no undesirable textures.

The continuous tone image D of FIG. 1, however, has uniform density region R2 of the minimum density and uniform density region R3 of the density higher than the minimum density. Region R3 is located in a downstream side of minimum density region R2 in the auxiliary scanning direction, in which the error-distributing image conversion process is successively performed. No pixels are turned ON in minimum density region R2 during the conceivable error-distributing image conversion process. Accordingly, binary conversion errors, which have been obtained at the region R1, are simply distributed and transmitted through the pixels in region R2. As the conversion process proceeds in region R2 along the auxiliary scanning direction, binary conversion errors gradually become uniform. Accordingly, those pixels that are located in region R2 away from region R1 will receive uniform amounts of binary conversion errors.

Pixels in the pixel rows within leading edge S will also receive uniform amounts of binary conversion errors distributed from the region R2. It is noted that all the pixels in the region R3 have the same density of one (1). Every time a pixel in the leading edge S is converted into the OFF level, a conversion error is calculated as equal to the modified density which has been calculated for the subject pixel. The conversion error is fractionally distributed to pixels located downstream of the subject pixel in the main scanning direction. In other words, each pixel in the leading edge S repeatedly receives almost a fixed amount of a fraction in the conversion error every time a pixel located in the upstream side of the subject pixel is turned OFF. Accordingly, every time a certain number of successive pixels, arranged in the main scanning direction, are converted into OFF levels, a pixel located next to the group of the successive pixels will be turned ON. This is because the density of that pixel is modified by the errors, distributed from the successively turned-ON pixels, into a valve high enough to exceed the threshold.

Thus, according to the conceivable error-distributing image conversion process, pixels in the edge S will be turned ON at a regular interval, thereby creating an undesirable texture. It is noted, however, that as the conversion process further proceeds in region R3 in the auxiliary scanning direction, the values of the conversion errors will change irregularly. This is because each turned-ON pixel distributes, to its downstream side pixels, a conversion error which is calculated through subtracting the maximum density from the density modified for the subject pixel. Accordingly, the texture will become unnoticeable at locations away from the region R2.

Contrarily, according to the image conversion method of the present invention, pixels having the minimum density (0, for example) are compulsively turned OFF. All the pixels in region R2 will therefore be turned OFF similarly to the conceivable image conversion process. No pixels in the region R2 will be turned ON.

In order to calculate a binary conversion error to be distributed or affected from each minimum density pixel, however, the first imaginary density A, which is greater than the minimum density, is used in place of the minimum density. That is, in order to calculate the conversion error, the first imaginary density A is added with errors distributed from pixels, which have been already processed and which are located in the neighborhood of the subject pixel. Thus, a modified density is calculated for the subject pixel. The modified density is then compared with the threshold value. When the modified density is smaller than the threshold value, the conversion error is calculated as equal to the modified density.

Thus, every time a pixel in region R2 is processed, a binary conversion error, which is comprised of the first imaginary density A and errors distributed from the already-processed pixels, will be repeatedly accumulated onto unprocessed pixels in the minimum density region R2. Because the first imaginary density A has an amount greater than the minimum density, the sum of the conversion errors accumulated on the unprocessed pixels will gradually increase. Some pixels in the minimum density region R2 will have their modified densities become greater than the threshold value. This is contrary to the conceivable process where no pixels in the minimum density region R2 have their modified densities become greater than the threshold value.

When the modified density calculated for one pixel to be processed becomes greater than the threshold, a binary conversion error, to be distributed or affected from the subject pixel to unprocessed pixels, is calculated as a value obtained through subtracting the value X from the modified density. The value X is greater than the imaginary density A and is equal to or smaller than the maximum density. For example, the value X is equal to the maximum density.

According to the conceivable process, when processing each pixel in minimum density region R2, the modified density is calculated as a sum of the minimum density and errors distributed from already-processed neighboring pixels. The modified value will therefore always become smaller than the threshold value. Accordingly, as the conversion process proceeds in minimum density region R2, the conversion error will become gradually uniform, and the uniform amount of the conversion error will be repeatedly distributed to the unprocessed pixels.

Contrarily, according to the present invention, the first imaginary density A, greater than the minimum density, is used to calculate the modified density. Accordingly, there will occur, even in minimum density region R2, that the modified density become greater than the threshold value. There will frequently be attained in the minimum density region R2 that a conversion error is calculated through subtracting the value X from the modified density. Due to this subtracting process, the amount of the conversion error widely changes. Errors with frequently- and irregularly-changing amounts will be successively distributed to unprocessed pixels. Thus, even when the conversion process proceeds in minimum density region R2, conversion errors with uniform values will not be distributed to unprocessed pixels.

Thus, pixels in leading edge S will not receive conversion errors with uniform densities. Pixels in leading edge S will be turned ON irregularly, thereby preventing occurrence of the undesirable texture.

It is now assumed that the error-distributing image conversion method of the present invention is performed onto the continuous tone image D of FIG. 1 where all the pixels in region R2 have the maximum density of 255 and all the pixels in region R3 have the density of 254.

According to the method of the present invention, those maximum density pixels are compulsively converted into ON levels. No pixels in the maximum density region R2 are therefore turned OFF. In order to calculate a conversion error to be distributed from each maximum density pixel to its neighboring unprocessed pixels, a second imaginary density B is used in place of the maximum density. The second imaginary density B is defined as smaller than the maximum density. The imaginary density B is first added with errors distributed from already-processed neighboring pixels. Thus, a modified density is obtained for this maximum density pixel. The modified density is then compared with the predetermined threshold value. When the modified density is smaller than the threshold value, a binary conversion error is set as equal to the modified density. When the modified density is equal to or greater than the threshold value, on the other hand, the binary conversion error is set as a value calculated through subtracting a value Y from the modified density, where the value Y is greater than the second imaginary density B and is equal to or lower than the maximum density. That is, $B<Y\leq 255$ when density of the continuous tone image is defined in the multilevel range of zero (0) to 255. For example, the value Y is equal to the maximum density of 255.

Accordingly, binary conversion errors, which have been obtained at region R1, are not simply distributed and transmitted through pixels in maximum density region R2. As the conversion process of the present invention proceeds in maximum density region R2, a binary conversion error obtained for each processed pixel will gradually decrease. There will occur at some pixels that modified densities calculated for those pixels become smaller than the threshold value. When the modified density calculated for one pixel to be processed becomes smaller than the threshold, a binary conversion error, to be distributed from the subject pixel to its unprocessed pixels, is calculated as a value equal to the modified density.

According to the conceivable process, when processing each pixel in maximum density region R2, the modified density is calculated as a sum of the maximum density and errors distributed from already-processed neighboring pixels. The modified value will therefore always become greater than the threshold value. A conversion error, to be distributed to unprocessed pixels, is therefore always calculated through subtracting the maximum density from the modified value. Accordingly, as the conversion process proceeds in the maximum density region R2, the conversion error will become gradually uniform, and the uniform amount of the conversion error will be repeatedly distributed to unprocessed pixels.

Contrarily, according to the present invention, the second imaginary density B, smaller than the maximum density, is used to calculate the modified density. Accordingly, there will occur, even in maximum density region R2, that the modified density becomes smaller than the threshold value. This is contrary to the conceivable process. According to the present invention, there will frequently be attained in maximum density region R2 that a conversion error is calculated as equal to the modified density. Due to this conversion error calculating process, the amount of the conversion error widely changes. Errors with frequently- and irregularly-changing amounts will be distributed to unprocessed pixels. Thus, even when the conversion process proceeds in the maximum density region R2, conversion errors with uniform values will not be distributed to unprocessed pixels.

Thus, pixels in leading edge S of region R3 will not receive conversion errors with uniform densities. Pixels in the leading edge S will be turned OFF irregularly, thereby preventing occurrence of the undesirable texture.

The imaginary density A is preferably set to be lower than the imaginary density B.

The imaginary density A is preferably set to be as low as possible, but is greater than the minimum density. If the imaginary density A has a high value, there will frequently occur that a modified density exceed the threshold. As a result, a conversion error will frequently be calculated through subtracting the value X from the modified density. The modified density will therefore become low at too many pixels. Accordingly, no dots will be generated at too many pixels, whereby conversion errors will become uniform, and the effect of the present invention may not be attained. According to the present invention, it is preferable to effectively attain the advantage of the present invention especially when the input density is low. Accordingly, the imaginary density A is preferably set as small as possible so that there will not frequently occur that the modified density exceed the threshold and that low conversion errors will not be obtained at too many pixels.

The imaginary density A is preferably as small as possible so that a density difference between the imaginary density A and the original density will become small for the minimum density pixel.

Accordingly, in order to more reliably prevent occurrence of the undesirable textures, it is preferable that the minimum density has a value of zero (0) and that the first imaginary density A is in the range of one (1) and a value obtained by dividing the maximum density by sixteen (16).

The value of the imaginary density A may be set randomly as the conversion process proceeds through the respective pixels so that the average of the set values will become greater than the minimum density. That is, every time a pixel to be processed is judged as the minimum density pixel, a value is set randomly as the first imaginary density A for the pixel to be processed. Thus randomly setting the imaginary density A will further disturb regularity in the undesirable texture.

More specifically, it is preferable to randomly set the values of the first imaginary density A for all the minimum density pixels in the continuous tone image, while the minimum density pixels are successively processed to the error-distributing binary conversion processes, so that the randomly-set values for all the minimum density pixels will have an average greater than the minimum value.

Or, a group of density values may be created in advance so that the average of the density values included in the density value group will become greater than the minimum value. The imaginary density A may be selected from the density value group in succession as the conversion process proceeds through the respective pixels. Thus changing the amount of the imaginary density A will also disturb the regularity in the undesirable textures.

More specifically, it is preferred to prepare in advance an array of values, whose average being greater than the minimum density, and to select the values from the value array in a predetermined order while all the minimum density pixels in the continuous tone image are successively processed.

When the minimum density is zero (0) and the maximum density is 255, the first imaginary density A is preferably set in a range of 1 to 16 in order to reproduce the original continuous tone image with high quality without creating the undesirable textures.

The imaginary density B is preferably set to be as high as possible, but is smaller than the maximum density. If the imaginary density B has a low value, there will frequently occur that a modified density not exceed the threshold. As a result, a conversion error will frequently be calculated as equal to the modified density. The modified density will become high at too many pixels. Accordingly, dots will be generated at too many pixels, whereby conversion errors will become uniform, and the effect of the present invention may not be attained. According to the present invention, it is preferable to effectively attain the advantage of the present invention especially when the input density is high. Accordingly, the imaginary density B is preferably set as high as possible so that there will not frequently occur that the modified density become smaller than the threshold and that high conversion errors will not be obtained at too many pixels.

The imaginary density B is preferably as large as possible so that a density difference between the imaginary density B and the original density will become small for the maximum density pixel.

When the minimum density is zero (0), the second imaginary density B is preferably set in a range of [(maximum density)−1] to [(maximum density)−(maximum density)/16] in order to reliably prevent occurrence of the undesirable textures.

The value of the second imaginary density B may be set randomly as the conversion process proceeds through the respective pixels so that the average of the set values will become smaller than the maximum density. That is, every time a pixel to be processed is judged as the maximum density pixel, a value is set randomly as the second imaginary density B for the maximum density pixel. Thus randomly changing the imaginary density B will further disturb the regularity in the undesirable texture.

More specifically, it is preferable to randomly set the values of the second imaginary density B for all the maximum density pixels in the continuous tone image, while the maximum density pixels are successively processed to the error-distributing binary conversion processes, so that the randomly-set values for all the maximum density pixels will have an average smaller than the maximum value.

Or, another group of density values may be created in advance so that the average of the density values included in the density value group will become smaller than the maximum value. The imaginary density B may be selected from the density value group in succession as the conversion process proceeds through the respective pixels. Thus changing the amount of the imaginary density B will further disturb the regularity in the undesirable textures.

More specifically, it is preferable to prepare in advance an array of values, whose average being smaller than the maximum density, and to select the values from the value array in a predetermined order while all the maximum density pixels in the continuous tone image are successively processed.

When the minimum density is zero (0) and the maximum density is 255, the second imaginary density B is preferably set in a range of 239 to 254 in order to reproduce the original continuous tone image with high quality without creating the undesirable textures.

A method according to preferred embodiments of the present invention will be described below in greater detail while referring to the accompanying drawings.

[First Embodiment]

A first embodiment will be described below with reference to FIGS. 2 through 5. The error-distributing image conversion process employed in the first embodiment is of the error diffusion type for distributing an error, generated when each pixel is processed, to neighboring pixels not yet processed.

Figure 2:
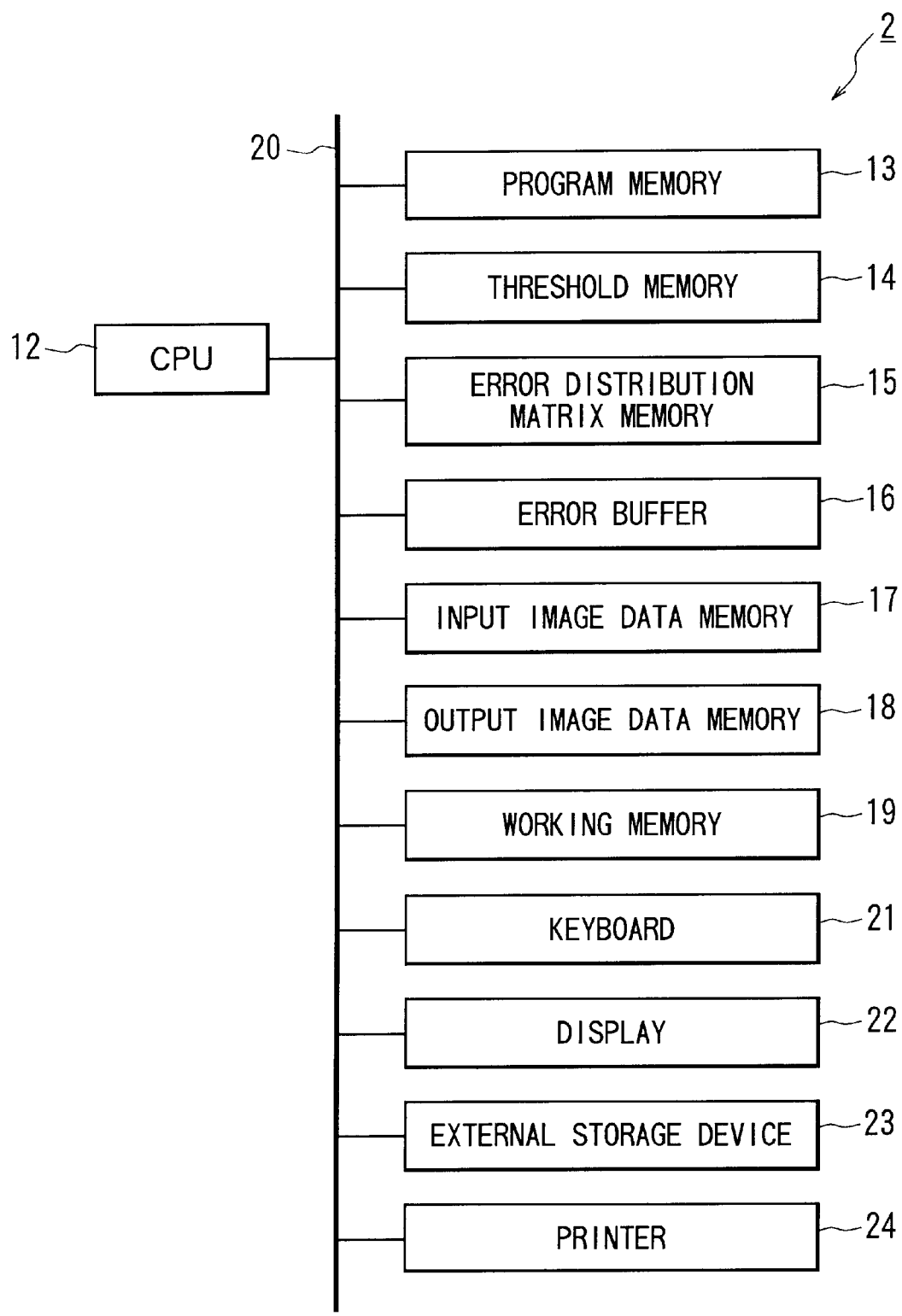
FIG. 2 is a block diagram of an image conversion device of a first embodiment of the present invention.

FIG. 2 is a block diagram of a continuous tone image data conversion device 2 for performing the error diffusion image conversion process of the present embodiment. The device 2 is for converting input continuous tone image with 256 tone levels into binary pseudo-halftone output images through the error diffusion image conversion method of the present embodiment.

A main part of the image conversion device 2 is constructed from a microcomputer. The microcomputer includes: a CPU 12; a program memory 13 constructed from a ROM; a threshold storage portion 14 prepared in a RAM; an error distribution matrix memory 15 also prepared in the RAM; an error buffer 16 also prepared in the RAM; an input image memory 17 also prepared in the RAM; an output image memory 18 also prepared in the RAM; and a working memory 19 also prepared in the RAM. The respective elements 12 through 19 are connected to one another via a system bus line 20 to exchange control signals and data signals therebetween.

The image conversion device 2 is further provided with: input/output elements, such as a keyboard 21 and a display 22, which are required for the device 2 to perform a computing operation; an external storage device 23 such as a hard disk drive and a floppy disk drive; and a printer 24. These elements 22 through 24 are also connected to the elements 12–19 via the bus 20.

Figure 3:
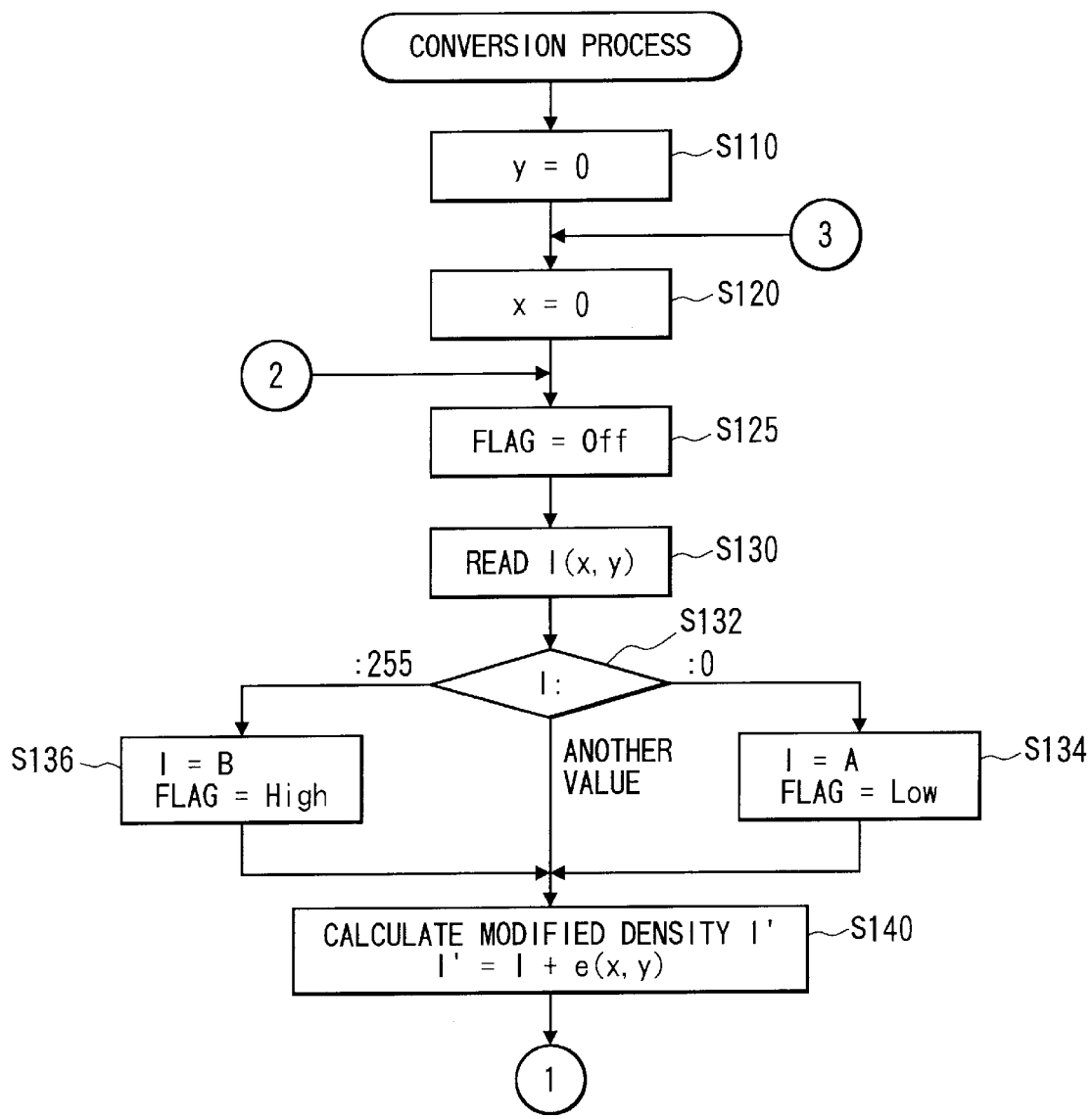
FIG. 3 is part of a flow chart of an error diffusion type image conversion process employed by the image conversion device of FIG. 2.
Figure 4:
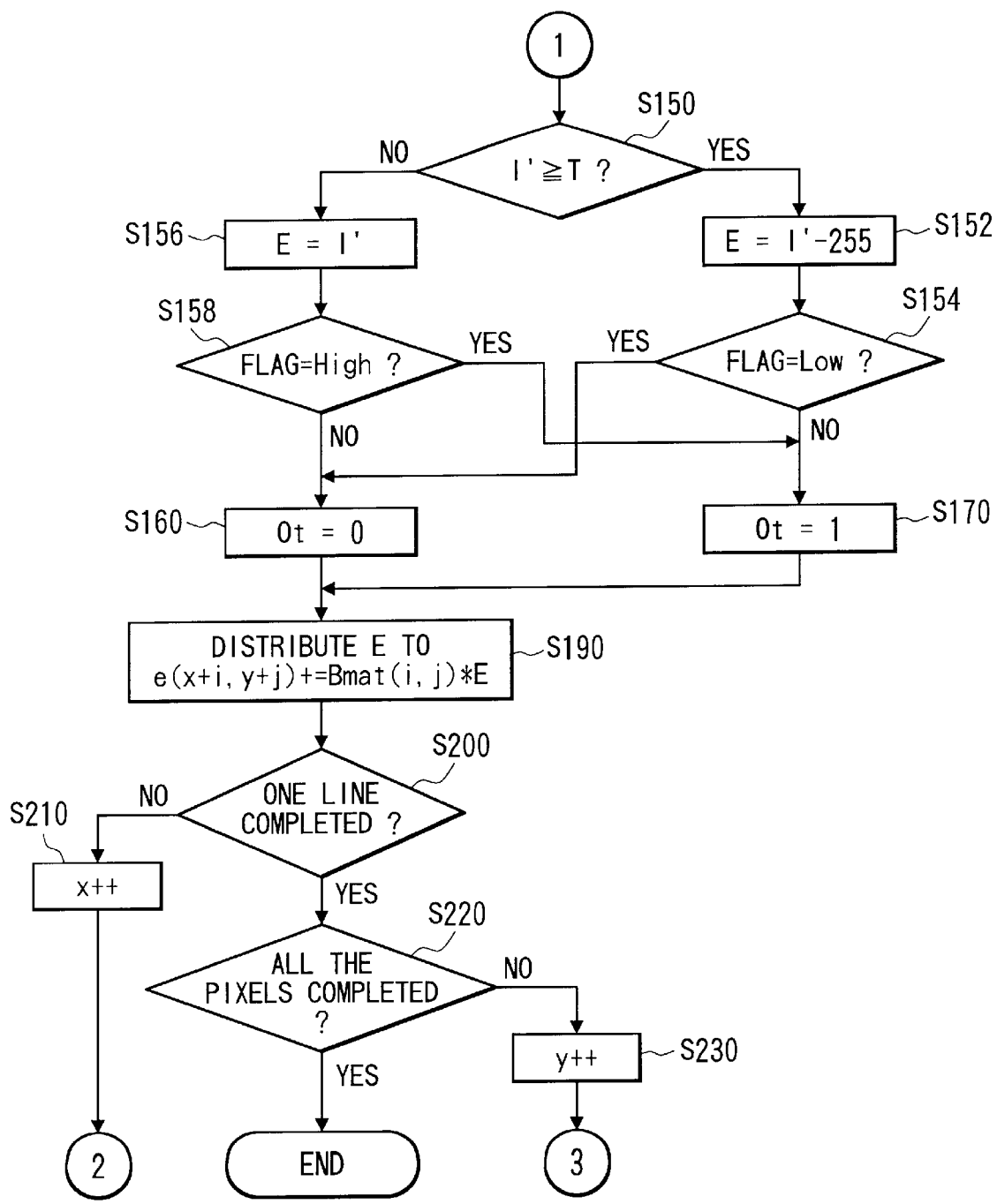
FIG. 4 is remaining part of the flow chart of the error diffusion type image conversion process employed by the image conversion device of FIG. 2.

The program storage portion 13 stores therein; a basic program required for the device 2 to perform a computing operation; a program of an error diffusion image conversion process as shown in FIGS. 3 and 4 for converting continuous tone images into pseudo-halftone binary images; and other various processing programs. Each program is executed by the CPU 12 when required. It is noted that data of those programs may be previously stored in a floppy disk, a magnetooptical disk, a CD-ROM or the like. When required, data of the programs is retrieved from these data storage media by the operation of the external storage device 23 and is written into the working memory 19.

The threshold storage portion 14 stores therein a predetermined threshold value T to be used through the error-distributing image converting process.

Figure 5:
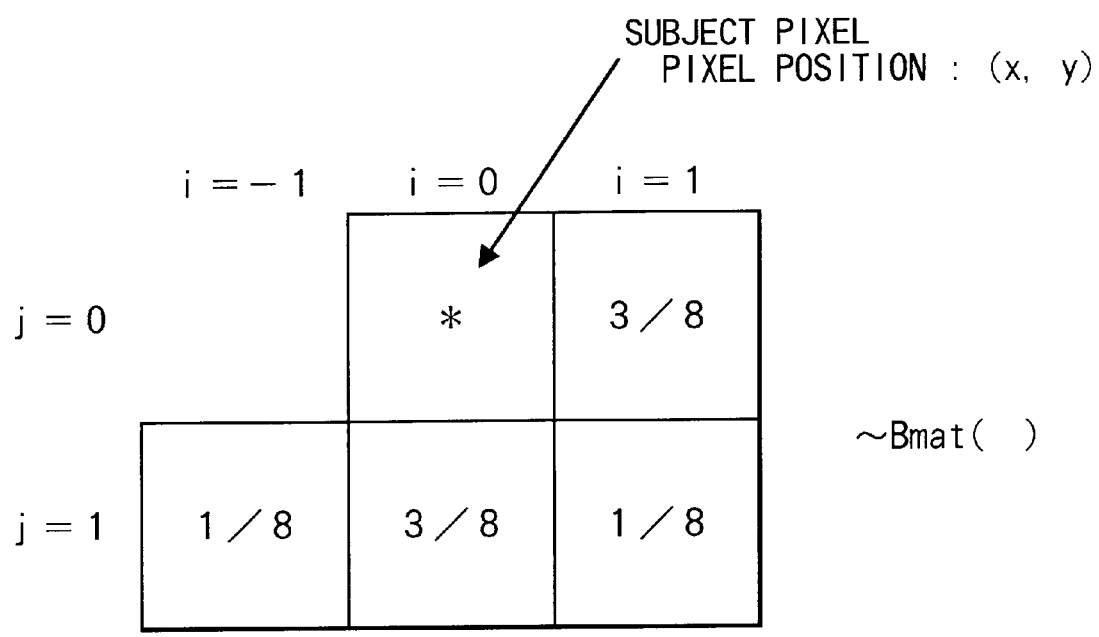
FIG. 5 illustrates one example of an error distribution matrix employed in the error diffusion image conversion process.

The error distribution matrix storage portion 15 previously stores therein an error diffusion matrix Bmat ( ) shown in FIG. 5. As shown in FIG. 5, the error distribution matrix Bmat ( ) indicates: neighboring pixels, to which a binarization error, occurred at a certain pixel (subject pixel) during the error diffusion image conversion process of FIGS. 3 and 4, is fractionally distributed; and distribution rates at which the error is fractionally distributed to the neighboring pixels.

It is noted that the binarization error is defined as a difference between an output intensity Ot, calculated through the error diffusion image conversion process, and a modified density, which is originated from an input density (original density) I or an imaginary density A or B set during the conversion process.

The error buffer 16 is for storing an accumulation of conversion errors e(x, y) distributed to each pixel (x, y) from its neighboring already-processed pixels. The input image data storage portion 17 is for storing data of a continuous tone image inputted from the external storage device 23 or the like as desired to be converted into a pseudo-halftone image. The input image data I (x, y) representative of density of each pixel (x, y) in the continuous tone image has a multilevel value in a range of zero (0) to 255. The output image data storage portion 18 is for storing pseudo-halftone image data Ot (x, y) which is obtained when the continuous tone image data I (x, y) in the storage portion 17 is subjected to the error diffusion image conversion process. The pseudo-halftone image data Ot(x, y) has a binary value of either ON (1) or OFF (0). When required, the thus obtained pseudo-halftone image data is displayed on the display 22 or is recorded by the printer 24.

With the above-described structure, the device 2 of the present embodiment converts a continuous tone image into a pseudo-halftone image with using the threshold value T stored in the memory 14 as described below.

The error diffusion image conversion process executed by the CPU 12 will be described below with reference to FIGS. 3 and 4. This error diffusion image conversion process is for converting the multilevel continuous tone image data I, stored in the input image data memory 17, into binary pseudo-halftone image data Ot.

When the process is started, variables x and y are initialized to zero (0) in S110 and S120. The variables x and y are for defining a subject pixel position (x, y) of the continuous tone image, whose density I(x, y) is to be converted into a binary value. It is noted that a main scanning direction x is defined along each pixel line, and an auxiliary scanning direction y is defined perpendicular to the main scanning direction x.

Next, a flag FLAG is set to OFF in S125. Then, input density I(x, y) (where $0 \leq I \leq 255$) for the subject pixel (x, y) of the input continuous tone image is retrieved in S130 from the input image data memory 17.

Next, it is judged in S132 whether the input density I(x, y) is a minimum value (0), a maximum value (255), or another value located within the range of 0<I<255.

It I(x, y)=0, a first imaginary density A is set to the subject image density I(x, y) in S134. The value of the first imaginary density A satisfies an inequality: 0<A<255. Preferably, the value of the first imaginary density A satisfies another inequality: $1 \leq A \leq 16$. In this example, A=1. Accordingly, in this case, I(x, y) is set to 1. Then, the flag FLAG is set to Low. Then, the program proceeds to S140.

On the other hand, if I(x, y)=255, a second imaginary density B is set to the subject image density I(x, y) in S136. The value of the second imaginary density B satisfies an inequality: 0<B<255. Preferably, the value of the second imaginary density B satisfies another inequality: $239 \leq B \leq 254$. In this example, B=254. Accordingly, in this case, I(x, y) is set to 254. Then, the flag FLAG is set to High. Then, the program proceeds to S140.

When it is judged in S132 that 0<I(x, y)<255, the program directly proceeds to S140. In S140, an error sum e(x, y) is retrieved from a corresponding memory location (x, y) in the buffer memory 16. The error sum e(x, y) is an accumulated amount of error fractions distributed from already-processed pixels neighboring to the subject pixel (x, y). The present density value I(x, y) is then modified by the error sum e(x, y). That is, the present density value I(x, y) is modified into a modified density I'(x, y) through the following formula (1):

$$I'(x, y) = I(x, y) + e(x, y) \quad (1)$$

Then, the program proceeds to S150 shown in FIG. 4. In S150, the modified density I'(x, y) is compared with the threshold value T read from the threshold memory 14. In this example, the threshold T has a value of 128.

If I'(x, y)$\geq$T ("Yes" in S150), a binary conversion error E(x, y) is calculated in S152 for the subject pixel (x, y) in the following formula (2):

$$E(x, y) = I'(x, y) - 255 \quad (2)$$

Then, the program proceeds to S154, in which it is judged whether or not the flag FLAG is now set to Low (FLAG=Low).

If I'(x, y)<T ("No" in S150), on the other hand, a binary conversion error E(x, y) is calculated for the subject pixel (x, y) in the following formula (3):

$$E(x, y) = I'(x, y) \quad (3)$$

Then, the program proceeds to S158, in which it is judged whether or not the flag FLAG is now set to High (FLAG=High).

If it is judged in S154 that flag FLAG=Low ("Yes" in S154) or if it is judged in S158 that flag FLAG$\neq$High ("No" in S158), the subject pixel density is converted in S160 into an output density value Ot(x, y) of zero (0=OFF).

On the other hand, if it is judged in S154 that flag FLAG$\neq$Low ("No" in S154) or if it is judged in S158 that flag FLAG=High ("Yes" in S158), the subject pixel density is converted in S170 into an output density value Ot(x, y) of one (1=ON).

The value of the thus obtained output density value Ot(x, y) is stored in the output image data memory 18 as binary data for the subject pixel (x, y).

After performing the process of S160 or S170, the program proceeds to S190, where the binary conversion error E(x, y) produced at the subject pixel (x, y) is distributed to the error buffer 16 at a location (x+i, y+j) for each of neighboring four pixels not yet processed. The binary conversion error E(x, y) is fractionally distributed to the neighboring pixels in a weighted basis defined by the predetermined error diffusion matrix Bmat( ) through the following formula (4):

$$e(x+1, y+j) += Bmat(i, j) \times E(x, y) \quad (4)$$

wherein += is an operator for calculating a sum of a value already stored in the error buffer (x+i, y+j) and a fraction of the error E(x, y) that is distributed to the corresponding pixel (x+i, y+j) from the subject pixel (x, y). A representative example of the matrix Bmat ( ) is shown in FIG. 5.

In the matrix Bmat( ), * indicates a subject pixel position (x, y), and each value in the matrix indicates a coefficient to be multiplied with the error E(x, y) before being distributed from the subject pixel (x, y) to a neighboring pixel (x+i, y+j), which is located relative to the subject pixel (x, y) as shown in the matrix. Thus distributed error fractional portion is accumulated in a corresponding memory location (x+i, y+j) in the error buffer 16 according to the formula (4). For example, the next pixel (x+1, y) on the same pixel line receives a $\frac{3}{8}^{th}$ part of the error E(x, y). The $\frac{3}{8}^{th}$ part of the error E(x, y) is therefore accumulated in the corresponding memory location (x+1, y) of the error buffer 16.

Next, in S200, it is judged whether or not all the pixels in the present pixel line along the main scanning direction (x direction) have been processed. When any pixels remain unprocessed ("no" in S200), a pixel position is shifted to the next pixel position (x+1, y) in S210, and the process returns to S125. Then, the process from S125 is repeated.

When all the pixels have been processed in the subject pixel line ("yes" S200), on the other hand, it is judged in S220 whether or not all the pixels in the input image have been processed. When any pixels remain unprocessed ("no" in S220), the pixel position is shifted to the next pixel line in the auxiliary scanning direction in S230. Then, the process returns to S120. Then, the process from S120 is repeated.

Thus, all the pixels (x, y) in the input continuous tone image are subjected to the error-distributing image conversion process on a pixel by pixel basis. That is, the input densities I(x, y) of all the pixels are successively converted into bilevel values Ot(x, y), and are stored in the memory 18.

When all the pixels have been processed ("yes" in S220), this process ends. At this time, a pseudo-halftone binary image is completely produced by the bilevel values Ot(x, y) stored for all the pixels (x, y) in the output image data memory 18.

During the above-described error diffusion image conversion process, when the subject pixel has the minimum value (0) of the density range 0–255 of the continuous tone image data, the flag FLAG is set to Low in S134. Accordingly, if the modified density I' for the pixel becomes equal to or greater than the threshold, the judgment process of S154 is executed to become always affirmative. If the modified density I' becomes smaller than the threshold, on the other hand, the judgment process of S158 is executed to become always negative. Accordingly, the program always proceeds to the process of S160. That is, the minimum density pixel is always turned OFF. All the pixels in minimum density region R2 in FIG. 1 will be turned OFF. No pixels will be turned ON in minimum density region R2.

Especially in S134, that pixel having the minimum input density I(x, y) of zero (0) is set with the first imaginary density A(=1), which is greater than the minimum density. Then, in S140, this density value I(=A) is added with errors distributed from neighboring pixels, and is modified into the modified value I'. Then, in S150, the modified value I' is compared with the threshold T.

As the program of FIGS. 3 and 4 is repeatedly performed onto pixels successively arranged in region R2, fractions of the imaginary densities A set in those pixels will be successively accumulated in the error buffers e(x+i, y+j) for unprocessed pixels. Accordingly, even in minimum density region R2 of FIG. 1, there will occur at some pixels that the modified density value I' exceed the threshold value T.

When the modified density I' becomes equal to or greater than the threshold T in the minimum density region ("Yes" in S150), the binary error E is calculated in S152 as equal to a value obtained through subtracting the value of 255 from the modified value I'. In the conceivable error diffusion process, as the pixels in minimum density region R2 are successively processed, conversion errors will gradually become uniform and will be distributed to unprocessed pixels and stored in the error buffer 16. Contrarily, according to the present embodiment, the modified value I' is calculated through using the imaginary density A(=1) that is greater than the minimum value. Accordingly, there will occur the cases where the modified value I' becomes equal to or higher than the threshold value T ("Yes" in S150). Accordingly, there are frequently performed in minimum density region R2 the process of S152 for subtracting 255 from the modified value I'.

As a result, uniformity in errors distributed to unprocessed pixels is disturbed. Accordingly, when the pixels in minimum density region are processed successively, errors will not be distributed uniformly to unprocessed pixels. Pixels in leading edge S of region R3 will therefore receive conversion errors non-uniformly distributed from minimum density region R2. Those pixels in leading edge S will therefore be turned ON irregularly, preventing occurrence of any undesirable textures.

Similarly, when the subject pixel has the maximum density (255) in the density range 0–255 of the continuous tone image data, the flag FLAG is set to High in S136.

Accordingly, if the modified density I' for the pixel becomes equal to or greater than the threshold, the judgment process of S154 becomes always negative. If the modified density I' becomes smaller than the threshold, on the other hand, the judgment process of S158 becomes always affirmative. Accordingly, the program always proceeds to the process of S170. That is, the maximum density pixel is always turned ON. If region R2 in FIG. 1 is the maximum density regions, all the pixels in the region R2 will be turned ON. No pixels will be turned OFF in the maximum density region.

Especially in S136, the pixel having the maximum input density I(x, y) of 255 is set with the second imaginary density B (=254), which is smaller than the maximum density. Then, in S140, this density value I (=B) is added with errors distributed from neighboring pixels, and is modified into the modified value I'. Then, in S150, the modified value I' is compared with the threshold T.

As the program of FIGS. 3 and 4 is repeatedly performed onto pixels successively arranged in the region R2, fractions of the difference "−1" between the imaginary density B and the maximum density of 255 will be successively accumulated in the error buffers e(x+1, y+j) for unprocessed pixels. Accordingly, even in maximum density region R2, there will occur at some pixels that the modified density value I' become smaller than the threshold value T.

When the modified density I' becomes smaller than the threshold T in the maximum density regions ("NO" in S150), the binary error E is calculated in S156 as equal to the modified value I'. In the conceivable error diffusion method, as the pixels in minimum density region R2 are successively processed, conversion errors will gradually become uniform and will be distributed to unprocessed pixels and stored in the error buffer 16. Contrarily, according to the present embodiment, the modified value I' is calculated through using the imaginary density B (=254) that is smaller than the maximum value. Accordingly, there will occur the cases where the modified value I' becomes smaller than the threshold value T ("No" in S150). Accordingly, there are frequently performed in maximum density region R2 the process of S156 for setting the modified value I' as the conversion error E. As a result, uniformity in errors distributed to unprocessed pixels is disturbed. Accordingly, even when the pixels in the maximum density region are processed successively, errors will not be distributed uniformly to unprocessed pixels.

Pixels in leading edge S of region R3 will therefore receive conversion errors distributed non-uniformly from maximum density region R2. Those pixels in leading edge S will therefore be turned OFF irregularly, preventing occurrence of any undesirable textures.

In the above-mentioned embodiment, the process of S132 serves to judge whether the subject pixel has the minimum density, the maximum density, or not. The process of S134 serves to set the first imaginary value A as the input density. The process of S136 serves to set the second imaginary value B as the input density. The process of S140 serves to calculate the modified density. The process of S150 serves to compare the modified density with the threshold. The processes of S152 and S156 serve to calculate a conversion error. The processes of S154, S158, S160, and S170 serve to convert the modified density into a binary value.

Functions for achieving the image conversion process of FIGS. 3 and 4 are stored as the computer program that are executed on the computer system 2. The program is stored on a data storage medium capable of being read by the computer system 2. In the present embodiment the program is stored in the ROM 13 capable of being read by the computer 2. The ROM 13 is installed in the computer system 2. However, the program may be stored in a backup RAM capable of being read by the computer 2. The backup RAM may be installed in the computer 2.

Or, the program may be stored in a floppy disk, a magneto-optic disk, a CD-ROM, a hard disk, or the like. The program is loaded into the computer system 2 and is executed as needed.

[Second Embodiment]

Next, a second preferred embodiment of the present invention will be described below with reference to FIG. 6.

Figure 6:
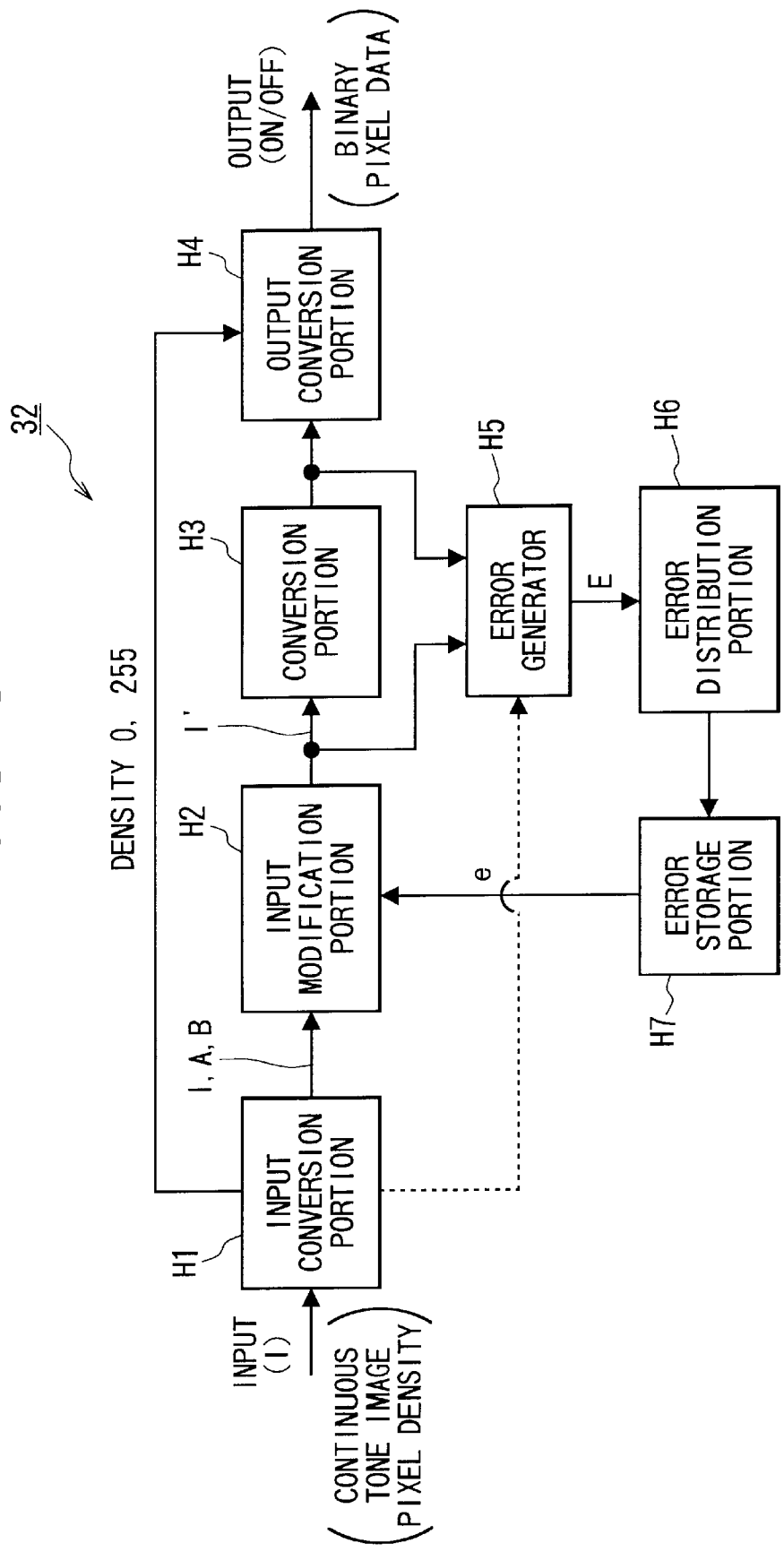
FIG. 6 is a block diagram of a hardware circuit in an image conversion device of a second embodiment of the present invention.

FIG. 6 shows a hardware circuit 32 for converting continuous tone image data into binary image data (pseudohalftone image data) through the functions equivalent to the processes of FIGS. 3 and 4.

The image converting device 32 includes: an input conversion portion H1, an input modification portion H2, a binary conversion portion H3, an output conversion portion H4, a binary error generating portion H5, an error distribution portion H6, and an error storage portion H7.

The input conversion portion H1 is for receiving input density data I defined in the density range of 0 to 255 for each pixel of the continuous tone image to be converted. The input conversion portion H1 judges whether the received input density I is equal to the minimum value of zero (0), the maximum value of 255, or not. When the input density of the minimum value of zero (0) is received, the input conversion portion H1 issues a first compulsive command to the output conversion portion H4 to control the output conversion portion H4 to output binary pixel data of OFF. When the input density of the maximum value of 255 is received, on the other hand, the input conversion portion H1 issues a second compulsive command to the output conversion portion H4 to control the output conversion portion H4 to output binary pixel data of ON. Thus, when the input density value I is either the maximum value or the minimum value, the input conversion portion H1 prevents the output conversion portion H4 from being controlled according to any instructions from the binary conversion portion H3, but directly instructs the output conversion portion H4 to output ON or OFF.

The input conversion portion H1 further outputs a pixel density value I of the first imaginary density A (=1, in this example) when the input pixel density value is equal to the minimum value of zero (0). The input conversion portion H1 outputs a pixel density value I of the second imaginary density B (=254, in this example) when the input pixel density value is equal to the maximum value of 255. The input conversion portion H1 outputs the received input density I as it is when the received input density is in the range of 1 to 254.

The input modification portion H2 instructs the error storage portion H7 to supply the input modification portion H2 with an error sum e accumulated for the subject pixel to be processed. The error sum e is an accumulation of errors distributed to the subject pixel from already-converted pixels and is accumulated in the error buffer located within the error storage portion H7. When receiving the error sum e, the input modification portion H2 calculates the modified density I' through adding the density value I inputted from the input conversion portion H1 with the error sum e. That is, the input modification portion H2 calculates the formula (1). The input modification portion H2 then outputs the modified density I' to the binary conversion portion H3.

The binary conversion portion H3 compares the modified value I', inputted from the input modification portion H2, with the threshold value T set in the binary conversion portion H3. When the modified value I' is greater than or equal to the threshold value T, the binary conversion portion H3 issues an instruction to the output conversion portion H4 to output a value of ON. When the modified value I' is smaller than the threshold value, on the other hand, the binary conversion portion H3 issues another instruction to the output conversion portion H4 to output a value of OFF.

The output conversion portion H4 outputs a value of OFF when receiving the first compulsive command from the input conversion portion H1. The output conversion portion H4 outputs the value of OFF also when receiving the instruction to turn OFF from the binary conversion portion H3 while receiving no second compulsive command from the input conversion portion H1. The output conversion portion H4 outputs a value of ON when receiving the second compulsive command from the input conversion portion H1. The output conversion portion H4 outputs the value of ON also when receiving the instruction to turn ON from the binary conversion portion H3 while receiving no first compulsive command from the input conversion portion H1.

The binary error generating portion H5 receives the modified value I' from the input modification portion H2. The binary error generating portion H5 also receives instructions to turn ON or OFF from the binary conversion portion H3. When instructed by the binary conversion portion H3 to turn ON, the binary error generating portion H5 calculates the conversion error E through the formula (2). On the other hand, when instructed by the binary conversion portion H3 to turn OFF, the binary error generating portion H5 calculates the conversion error E through the formula (3).

The error distribution portion H6 distributes the conversion error E, obtained by the binary error generating portion H5, to neighboring pixels with using the error distribution matrix Bmat() shown in FIG. 5, and accumulates the distributed errors to the error buffers, for the neighboring pixels, located in the error storage portion H7.

As described already, when instructed by the input modification portion H2, the error storage portion H7 will supply the input modification portion H2 with an error sum e accumulated for a pixel to be processed.

With the above-described structure, if the subject pixel density I is the minimum density (0), the input conversion portion H1 controls the output conversion portion H4 to output a level of OFF. If the subject pixel density I is the maximum density (255), the input conversion portion H1 controls the output conversion portion H4 to output the other level of ON. The input conversion portion H1 outputs the imaginary density A of one (1) to the input modification portion H2 if the subject pixel density I is the minimum density of zero (0). The input conversion portion H1 outputs the other imaginary density B of 254 to the input modification portion H2 if the subject pixel density I is the maximum density of 255. The conversion portion H3 compares, with the threshold value, a modified value I' supplied from the input modification portion H2. Even in the uniform density region having the density of zero (0) or 255, the comparison judgment attained by the conversion portion H3 will frequently change. The calculation process attained by the binary error generating portion H5 will frequently switch between two types of calculation processes (2) and (3). Uniformity in conversion errors distributed to the error distributing portion H6 to the error storing portion H7 is disturbed. Pixels will be turned ON and OFF irregularly, thereby preventing occurrence of undesirable textures. Thus, the conversion device 32 of the present embodiment can nonuniformly distribute conversion errors to pixels in the leading edge of region R3 as in the first embodiment. The positions of turned-ON pixels are nonuniformly distributed, thereby preventing occurrence of undesirable textures which may lower image quality.

[Third Embodiment]

Figure 7:
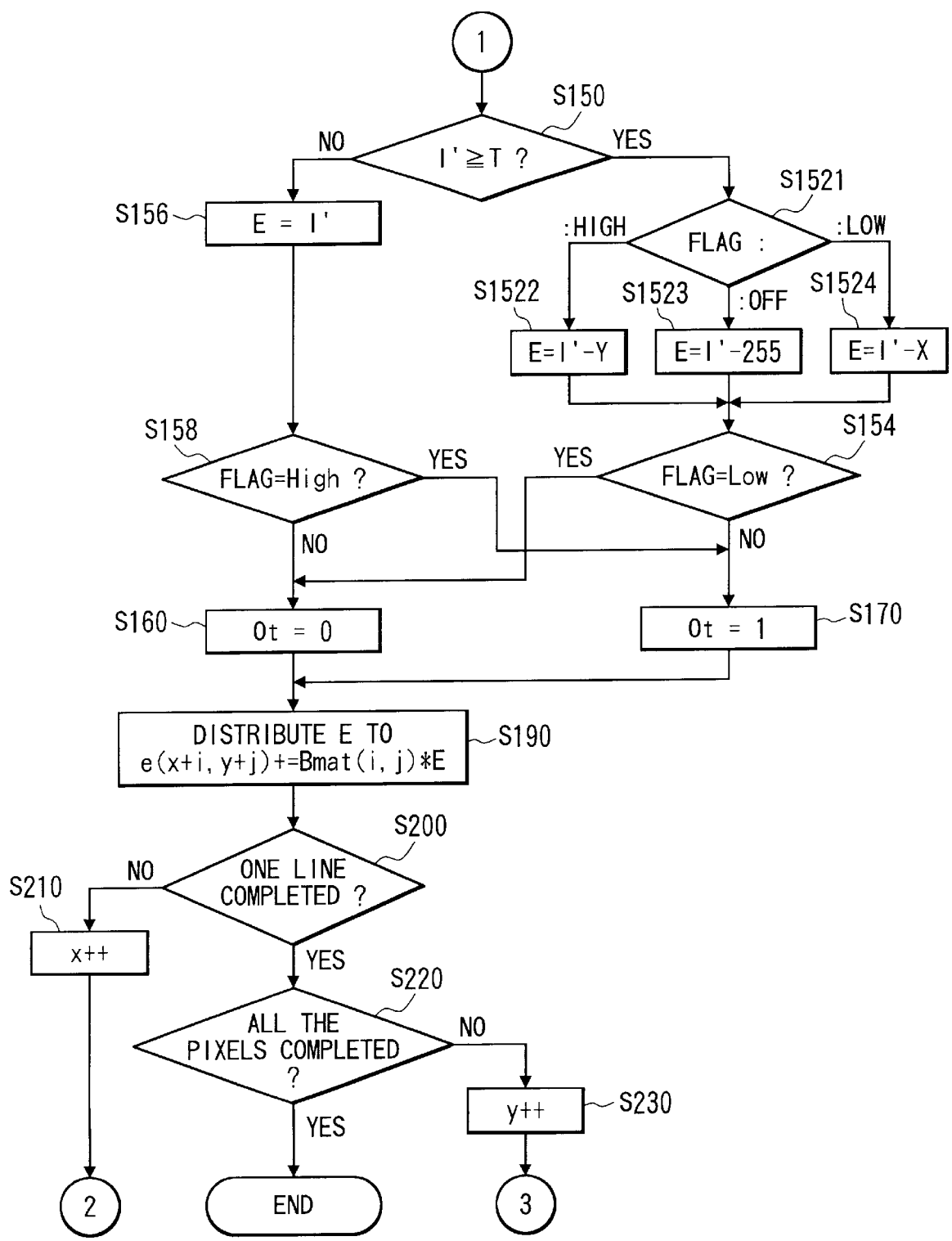
FIG. 7 is part of a flow chart of the error diffusion type image conversion process according to a third embodiment and corresponds to FIG. 4.

A third embodiment of the present invention will be described below with reference to FIG. 7.

According to the first embodiment, the process of S152 is designed to subtract the value of 255 from the modified value I' to obtain the conversion error E regardless of whether it is determined in S132 that I=0, 255, or not. However, the process of S152 may be divided into steps S1521 through S1524 as shown in FIG. 7. That is, when the original density I has been equal to the minimum density of zero (0) ("Low" in S1521), the conversion error E is calculated in S1524 as a value obtained through subtracting a value X from the modified value I' where the value X is greater than the imaginary density A and equal to or lower than the maximum density (255). That is, the conversion error E is calculated through the following formula (5):

$$E = I' - X \quad (5)$$

where X satisfies an inequality of A<X≦255. For example, X=255.

When the original density I has been equal to the maximum density of 255 ("High" in S1521), on the other hand, the conversion error E is calculated in S1522 as a value obtained through subtracting another value Y from the modified value I' where the value Y is greater than the imaginary density B and equal to or lower than the maximum density (255). That is, the conversion error E is calculated through the following formula (6):

$$E = I' - Y \quad (6)$$

where the value Y satisfies an inequality of B<Y≦255. For example, Y=255.

When the original density I has been different from both the minimum density of zero (0) and the maximum density of 255 ("Off" in S1521), on the other hand, the conversion error E is calculated in S1523 as a value obtained through subtracting the maximum value (255) from the modified value I'.

It is noted that the process of the first embodiment is the case where both of the values X and Y are set equal to 255.

It is noted that the above-described operation of the present embodiment can be applied to the second embodiment. That is, in this case, as indicated by a dotted line in FIG. 6, the conversion error generating portion H5 not only receives the instructions issued from the conversion portion H3 to turn ON and OFF but also receives the compulsive commands issued from the input conversion portion H1 to turn ON and OFF. When receiving the instruction to turn OFF from the binary conversion portion H3, the conversion error generating portion H5 calculates the binary conversion error with using the formula (3) in the same manner as in the second embodiment. When receiving the instruction to turn ON from the binary conversion portion H3, on the other hand, the conversion error generating portion H5 calculates the binary conversion error E with using the formula (2), (5), or (6) according to the contents of instructions received from the input conversion portion H1. That is, the conversion error generating portion H5 calculates the binary conversion error E with using the formula (2) if the conversion error generating portion H5 receives no compulsive commands from the input conversion portion H1. The conversion error generating portion H5 calculates the binary conversion error E with using the formula (5) if the conversion error generating portion H5 receives from the input conversion portion H1 the first compulsive command to turn OFF. The conversion error generating portion H5 calculates the binary conversion error E with using the formula (6) if the conversion error generating portion H5 receives from the input conversion portion H1 the second compulsive command to turn ON.

[Fourth Embodiment]

Figure 8:
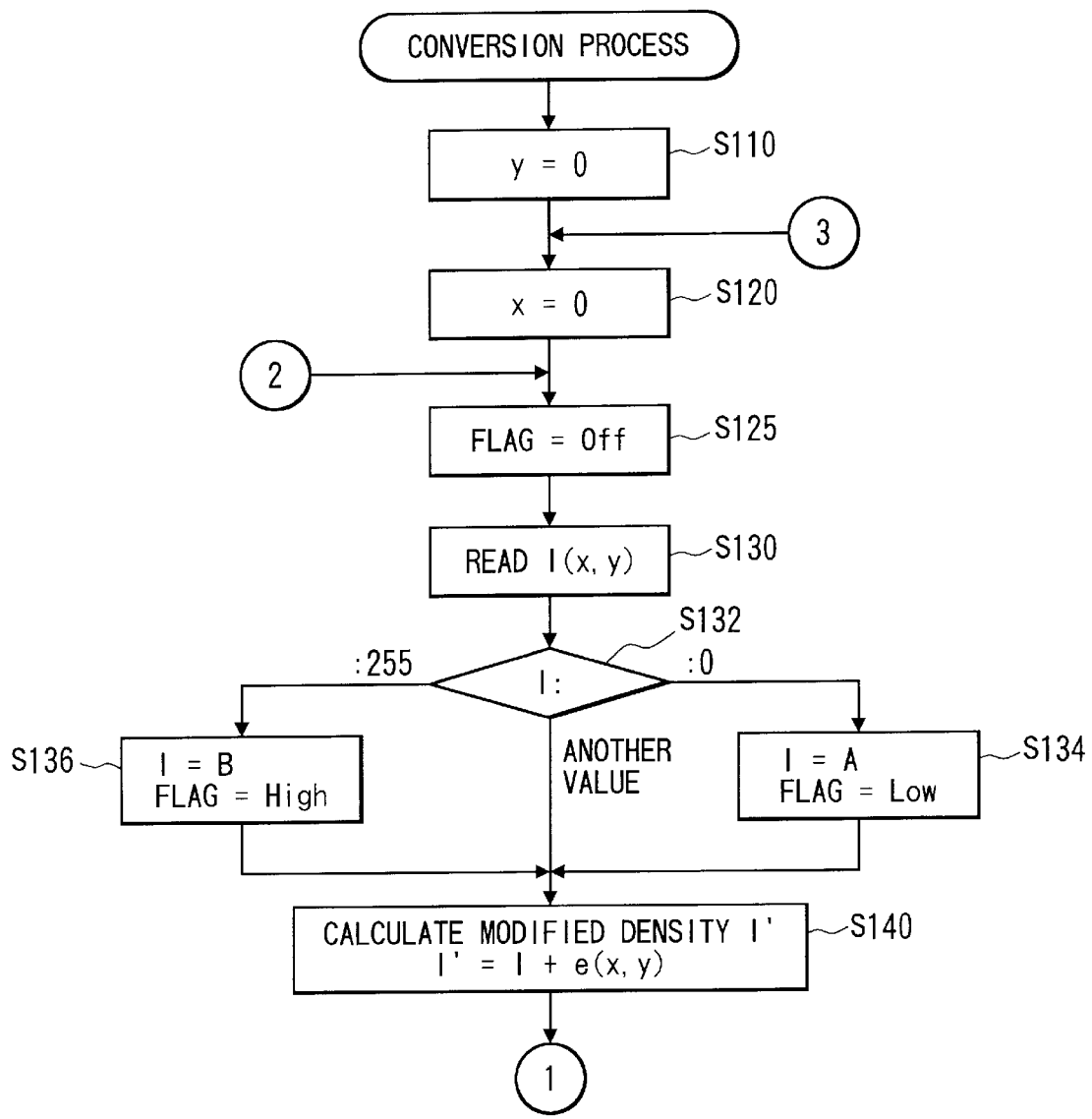
FIG. 8 is part of a flow chart of a minimized average error type image conversion process according to a fourth embodiment.
Figure 9:
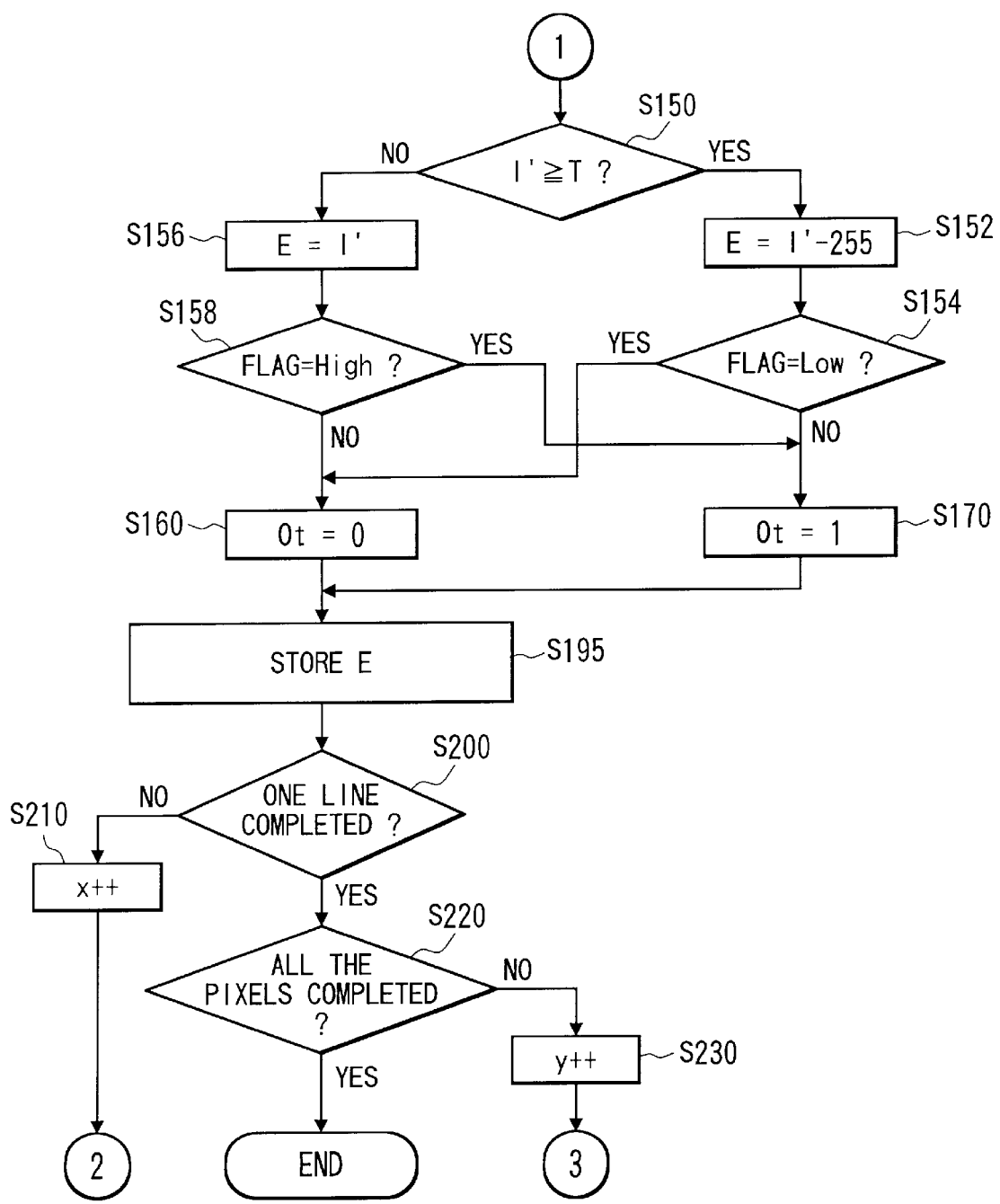
FIG. 9 is remaining part of the flow chart of the minimized average error type image conversion process.

A fourth preferred embodiment of the present invention will be described below with reference to FIGS. 8 and 9.

The error-distributing image conversion process employed in the first through third embodiments is of the error diffusion type for distributing an error, generated when each pixel is processed, to neighboring pixels not yet processed. However, the error-distributing image conversion process of the present invention may be designed to be of the minimized average error type for adding, to a density value of a subject pixel to be processed, fractional portions of binary-conversion errors which have been generated when already-processed neighboring pixels were processed.

The error-distributing image conversion method of the fourth embodiment is of the minimized average error type.

The image conversion process of the fourth embodiment is the same as that of the first embodiment shown in FIGS. 3 and 4 except that the density modification process of S140 is processed as described below and that the error distributing process of S190 is replaced with an error storing process of S195. The image conversion process of the present embodiment can be attained by the image conversion device (computer) 2 of FIG. 2.

In the error storing process of S195, according to the present embodiment, the conversion error E(x, y) calculated in S156 or S152 for the subject pixel (x, y) is merely stored in a corresponding location (x, y) of the subject pixel in the error buffer 16. Thus, according to the present embodiment, the error buffer 16 is used to store a conversion error E(x, y) for each pixel obtained when that pixel is processed.

In the density modification process of S140, the error sum e(x, y), to be distributed to the subject pixel (x, y) from already-processed four neighboring pixels (x−1, y−1), (x, y−1), (x+1, y−1), and (x−1, y), is first calculated based on a predetermined coefficient matrix α and binary conversion errors E(x−1, y−1), E(x, y−1), E(x+1, y−1), and E(x−1, y) which have been generated during the conversion processes at the neighboring four pixels. That is, the error sum e(x, y) for the subject pixel (x, y) is calculated through the following formula (7):

$$e(x, y) = (1/\Sigma \alpha\, ab) \times \Sigma(\alpha\, ab \times E\, ab) \quad (7)$$

The coefficient matrix α is shown below. This matrix α is stored in the memory 13 shown in FIG. 2.

$$\alpha \equiv \begin{pmatrix} 1 & 3 & 1 \\ 3 & * & \end{pmatrix}$$

where α ab is a coefficient value located at a location (a, b) in the matrix α where −1≦a≦1, −1≦b≦0. Eab is a binary conversion error E(x+a, y+b) generated at an already-processed pixel (x+a, y+b) neighboring to the subject pixel (x, y). The neighboring pixel (x+a, y+b) is located at a position corresponding to a location (a, b) relative to the subject pixel (x, y) indicated by * in the coefficient matrix α. The error Eab , i.e., E(x+a, y+b) is retrieved from a corresponding location (x+a, y+b) of the error buffer 16. Then, the modified binary I' for the subject pixel (x, y) is calculated through the formula (1) with using the error sum e(x, y) calculated through the formula (7).

[Fifth Embodiment]

Figure 10:
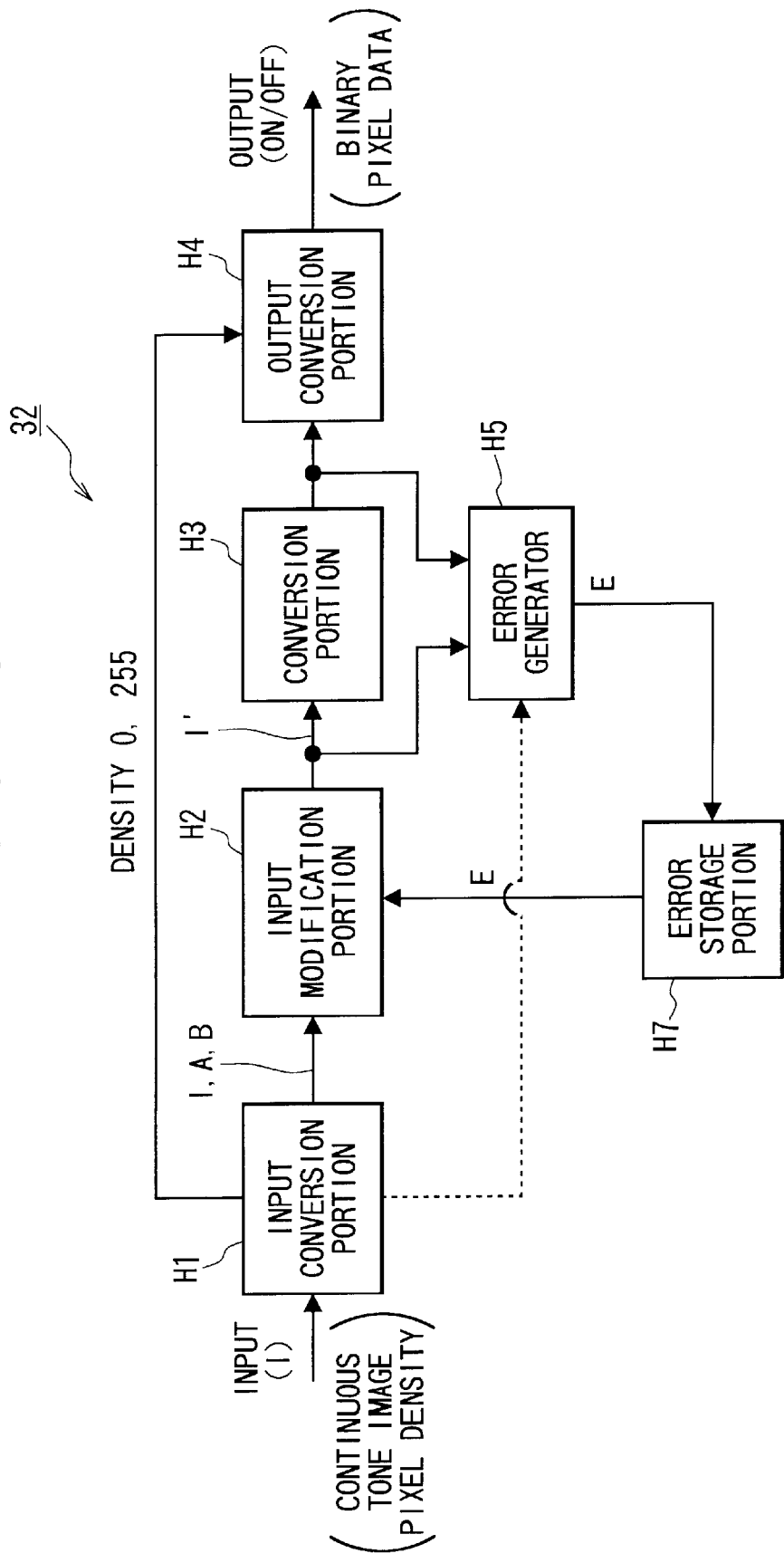
FIG. 10 is a block diagram of a hardware circuit according to a fifth embodiment for attaining the minimized average error type image conversion process of FIGS. 8 and 9.

FIG. 10 shows a hardware circuit according to a fifth embodiment of the present invention. The hardware circuit of FIG. 10 can attain the minimized average error method-type image conversion process of the fourth embodiment. This hardware circuit is the same as that of the second embodiment except that the error distribution portion H6 is not provided. The error storage portion H7 is modified to store a conversion error E(x, y) for each pixel which is produced when that pixel is processed. The input modification portion H2 is modified to calculate the error sum e(x, y), to be distributed to a pixel (x, y) to be processed, based on the conversion errors E(x−1, y−1), E(x, y−1), E(x+1, y−1), and E(x−1, y) stored in the error storage portion H7 for the already-processed four neighboring pixels (x−1, y−1), (x, y−1), (x+1, y−1), and (x−1, y). That is, the input modification portion H2 calculates the formula (7) before calculating the formula (1).

[Sixth Embodiment]

The processes of the fourth embodiment shown in FIGS. 8 and 9 may be modified as described below.

The error storing process of S195 in the fourth embodiment may be designed as an error distributing process for distributing the conversion error E(x, y), calculated in S156 or S152 at the subject pixel (x, y), not only to the subject pixel (x, y) but also to neighboring pixels (x+i, y+j).

For example, the process of S195 is designed to fractionally distribute the conversion error E(x, y) to: the subject pixel (x, y), already-processed neighboring pixels (x+i, y+j), and not-yet processed neighboring pixels (x+i, y+j) through calculating the following formula (4)' with using another example of the error diffusion matrix Bmat () shown in FIG. 11(a):

$$e'(x+i, y+j) += Bmat(i, j) \times E(x, y) \quad (4)'$$

wherein += is an operator for calculating a sum of a value already stored in the error buffer (x+i, y+j) and a fraction of the error E(x, y) that is distributed to the corresponding pixel (x+i, y+j) from the subject pixel (x, y).

In the example of the matrix Bmat() shown in FIG. 11(a), * indicates the subject pixel position (x, y), and each value in the matrix indicates a coefficient to be multiplied with the error E(x, y) before being distributed from the subject pixel (x, y) to a certain pixel (x+i, y+j), which is located relative to the subject pixel (x, y) as shown in the matrix. Thus distributed error fractional portion is accumulated, according to the formula (4)', with already-accumulated error fractional portions, which have been distributed from already-processed pixels to the certain pixel (x+i, y+j) and which are stored in the corresponding memory location (x+i, y+j) of the error buffer 16. For example, the subject pixel (x, y) receives a 8/16th part of the error E(x, y). The 8/16th part of the error E(x, y) is therefore accumulated in the memory location (x, y) of the error buffer 16. The already-processed pixel (x+1, y−1) receives a 3/16th part of the error E(x, y). The 3/16th part of the error E(x, y) is therefore accumulated in the memory location (x+1, y−1) of the error buffer 16. A not-yet processed pixel (x+1, y) receives a 4/16th part of the error E(x, y). The 4/16th part of the error E(x, y) is therefore accumulated in the corresponding memory location (x+1, y) of the error buffer 16.

In the present embodiment, the density modification process of S140 is modified so that the error sum e(x, y), to be distributed to the subject pixel (x, y) from already-processed four neighboring pixels (x−1, y−1), (x, y−1), (x+1, y−1), and (x−1, y), is first calculated based on the predetermined coefficient matrix α and binary conversion error sums e'(x−1, y−1), e'(x, y−1), e'(x+1, y−1), and e'(x−1, y). The binary conversion error sums e'(x−1, y−1), e'(x, y−1), e(x+1, y−1), and e'(x−1, y) have been calculated in S195 during conversion processes attained at already-processed pixels, and are stored in the error buffers (x−1, y−1), (x, y−1), (x+1, y−1), and (x−1, y). That is, the error sum e(x, y) to be distributed to the subject pixel (x, y) is calculated through the following formula (7)':

$$e(x, y) = (1/\Sigma \, \alpha \, ab) \times \Sigma(\alpha \, ab \times e' \, ab) \quad (7)'$$

The coefficient matrix α is shown below. This matrix α is stored in the memory 13 shown in FIG. 2.

$$\alpha \equiv \begin{pmatrix} 1 & 3 & 1 \\ 3 & * & \end{pmatrix}$$

where α ab is a coefficient value located at a location (a, b) in the matrix α where −1≦a≦1, −1≦b≦0. e'ab is a binary conversion error sum e'(x+a, y+b) obtained at an already-processed pixel (x+a, y+b) neighboring to the subject pixel (x, y). The neighboring pixel (x+a, y+b) is located at a position corresponding to a location (a, b) relative to the subject pixel (x, y) indicated by * in the coefficient matrix α. The error sum e'ab, i.e., e'(x+a, y+b) is retrieved from a corresponding location (x+a, y+b) of the error buffer 16.

Then, the modified density I' for the subject pixel (x, y) is calculated through the formula (1) with using the error sum e(x, y) calculated through the formula (7)'.

Thus, in S195 of the present embodiment, some fractions of the conversion error E(x, y) are distributed to the already-processed pixels (x+1, y−1), (x+2, y−1), and (x, y). Those error fractions will then be affected onto not-yet processed pixels when those not-yet processed pixels are processed, that is, when densities of those not-yet processed pixels are modified in S140 through the formulas (7)' and (1) with error fractions accumulated for already-processed pixels. Thus, according to this example, the conversion error E(x, y) is fractionally distributed to already-processed pixels (the subject pixel (x, y) and the already-processed neighboring pixels) that can affect errors onto not-yet processed pixels through the process of S140.

The process of S195 may also be designed to fractionally distribute the conversion error E(x, y): to the subject pixel (x, y) and to unprocessed neighboring pixels (x+i, y+j) through calculating the formula (4)' with using another example of the error diffusion matrix Bmat () shown in FIG. 11(b). In this example, the subject pixel (x, y) receives a 8/16th part of the conversion error E(x, y). The 8/16th part of the error E(x, y) is therefore accumulated in the memory location (x, y) of the error buffer 16. An unprocessed pixel (x+1, y) receives a 3/16th part of the error E(x, y). The 3/16th part of the error E(x, y) is therefore accumulated in the corresponding memory location (x+1, y) of the error buffer 16.

It is noted that the process of S195 in the fourth embodiment can be designed to distribute the conversion error E(x, y) only to the subject pixel (x, y) through calculating the formula (4)' with using still another example of the error diffusion matrix Bmat() shown in FIG. 11(c). In this example, the subject pixel (x, y) receives the entire part of the conversion error E(x, y). The entire part of the error E(x, y) is therefore accumulated in the memory location (x, y) of the error buffer 16.

Figure 11:
FIG. 11(a) illustrates another example of the error distribution matrix employed in a sixth embodiment of the minimized average error type image conversion process.
FIG. 11(b) illustrates still another example of the error distribution matrix employed in the sixth embodiment of the minimized average error type image conversion process.
FIG. 11(c) illustrates another example of the error distribution matrix employed in the sixth embodiment of the minimized average error type image conversion process.

In order to realize the above-described process of the sixth embodiment, the hardware circuit of FIG. 10 may be modified so that the error generator H5 calculate the formula (4)' with using either one of the examples in the error diffusion matrix Bmat() shown in FIGS. 11(*a*) and 11(*b*) and then store the calculated error sum e' into the error storage portion H7. The input modification portion H2 calculates the formulas (7)' and (1) to obtain a modified density.

While the invention has been described in detail with reference to the specific embodiments thereof, it would be apparent to those skilled in the art that various changes and modifications may be made therein without departing from the spirit of the invention.

For example, the fourth embodiment can be modified as in the third embodiment. That is, the process of S152 shown in FIG. 9 may be divided into the processes S1521–S1524.

Similarly, the fifth embodiment can be modified as in the third embodiment. That is, as indicated by a dotted line in FIG. 10, the conversion error generating portion H5 may be modified to receive the compulsive commands issued from the input conversion portion H1 to turn ON and OFF. When receiving the instruction to turn ON from the binary conversion portion H3, the conversion error generating portion H5 may calculate the binary conversion error E with using the formula (2), (5), or (6) according to the contents of instructions received from the input conversion portion H1.

The above-described embodiments are designed to convert a continuous tone image into a pseudo-halftone image while preventing occurrence of undesirable textures both in a transition area from the minimum density region to a middle density region and in another transition area from the maximum density region to a middle density region. However, it is sufficient to convert a continuous tone image into a pseudo-halftone image while preventing occurrence of undesirable textures at least in one of the transition area from the minimum density region to the middle density region and the transition area from the maximum density region to the middle density region.

For example, it is sufficient to convert a continuous tone image into a pseudo-halftone image while preventing occurrence of undesirable textures in the transition area from the minimum density region to the middle density region. The first embodiment may therefore be modified so that the process of S132 shown in FIG. 3 merely judge whether or not the input density I is zero (0) and so that the process of S136 be omitted. In this case, the process of S158 in FIG. 4 is omitted so that the program directly proceeds from S156 to S160. The fourth embodiment may be modified in the same manner as the first embodiment. The third embodiment may be modified so that the process of S158 and the process of S1522 in FIG. 7 be omitted. The second and fifth embodiments may be modified so that the input conversion portion H1 merely judge whether the received input density I is equal to the minimum value of zero (0) or not. According to the judged result, the input conversion portion H1 selectively issues the first compulsive command to the output conversion portion H4, and issues the first imaginary value A or the received input density I to the input modification portion H2.

Similarly, it is sufficient to convert a continuous tone image into a pseudo-halftone image while preventing occurrence of undesirable textures in the transition area from the maximum density region to the middle density region. In this case, the first embodiment may be modified so that the process of S132 shown in FIG. 3 merely judge whether or not the input density I is 255 and so that the process of S134 be omitted. In this case, the process of S154 in FIG. 4 is omitted so that the program directly proceeds from S152 to S170. The fourth embodiment may be modified in the same manner as the first embodiment. The third embodiment may be modified so that the process of S154 and the process of S1524 in FIG. 7 be omitted. The second and fifth embodiments may be modified so that the input conversion portion H1 merely judge whether the received input density I is equal to the maximum value of 255 or not. According to the judged result, the input conversion portion H1 selectively issues the second compulsive command to the output conversion portion H4, and issues the second imaginary value B or the received input density I to the input modification portion H2.

What is claimed is:

1. A method for converting a continuous tone image into a pseudo-halftone image, the method comprising the steps of:

receiving data of a continuous tone image desired to be converted into a pseudo-halftone image, the continuous tone image having a plurality of pixels, each pixel having one density value defined in a range between a predetermined minimum density and a predetermined maximum density; and subjecting all the pixels of the continuous tone image to an error-distributing binary conversion process on a pixel by pixel basis, to thereby convert the density values of the pixels into binary values while calculating conversion errors and distributing the calculated conversion errors to neighboring pixels, while performing at least one of a first compulsive converting process and a second compulsive converting process, the first compulsive converting process being for compulsively converting a minimum density pixel that has the minimum density into a first binary value and calculating a conversion error, to be distributed from the minimum density pixel to its neighboring pixels, through using a first imaginary density, greater than the minimum density, as the density value for the minimum density pixel, the second compulsive converting process being for compulsively converting a maximum density pixel that has the maximum density into a second binary value and calculating a conversation error, to be distributed from the maximum density pixel to its neighboring pixels, through using a second imaginary density, smaller than the maximum density, as the density value for the maximum density pixel.

2. A method as claimed in claim 1, wherein all the pixels of the continuous tone image are successively subjected to the error-distributing binary conversion process, while each minimum density pixel being compulsively converted into the first binary value and the conversion error, to be distributed from the minimum density pixel to its neighboring pixels, being calculated through using the first imaginary density as the density value for the minimum density pixel.

3. A method as claimed in claim 2, wherein the error-distributing binary conversion step includes the steps of:

(a) judging whether or not a pixel to be processed to the error-distributing binary conversion process has the minimum density or another value different from the minimum density;

(b) setting the first imaginary density when the subject pixel has the minimum density;

(c) calculating a modified density for the subject pixel, the modified density being calculated, if the subject pixel has the minimum density, through adding the first imaginary density with fractional portions of errors distributed from already-processed pixels neighboring to the subject pixel, the modified density being calculated, if the subject pixel has the density different from the minimum density, through adding the density of the subject pixel with the fractional portions of errors distributed from the already-processed pixels neighboring to the subject pixel;

(d) comparing the modified density with a predetermined threshold value;

(e) compulsively converting the subject pixel into the first binary value regardless of the compared result when the subject pixel has the minimum density, converting the subject pixel into the first binary value when the subject pixel has the density different from the minimum density and when the modified density is smaller than the threshold value, and converting the subject pixel into the second binary value when the subject pixel has the density different from the minimum density and when the modified density is equal to or greater than the threshold value;

(f) calculating a conversion error to be distributed from the subject pixel to pixels neighboring to the subject pixel, the conversion error being calculated as equal to the modified density when the modified density is smaller than the threshold value, the conversion error being calculated as a value obtained through subtracting the maximum value from the modified density when the modified density is equal to or greater than the threshold value and when the subject pixel has the density different from the minimum density, the conversion error being calculated as equal to a value obtained through subtracting a value X from the modified density when the modified density is equal to or greater than the threshold value and when the subject pixel has the minimum density, the value X being greater than the first imaginary density and being equal to or smaller than the maximum density; and (g) repeating the steps (a) through (f) for each of all the pixels within the continuous tone image, thereby producing the pseudo-halftone image.

4. A method as claimed in claim 1, wherein all the pixels of the continuous tone image are successively subjected to the error-distributing binary conversion process, while each maximum density pixel being compulsively converted into the second binary value and a conversion error, to be distributed from the maximum density pixel to its neighboring pixels, being calculated through using the second imaginary density as the density value for the maximum density pixel.

5. A method as claimed in claim 4, wherein the error-distributing binary conversation step includes the steps of:

(a) judging whether or not a pixel to be processed to the error-distribution binary conversion process has the maximum density or another value different from the maximum density;

(b) setting the second imaginary density when the subject pixel has the maximum density;

(c) calculating a modified density for the subject pixel, the modified density being calculated, if the subject pixel has the maximum density, through adding the second imaginary density with fractional portions of errors distributed from already-processed pixels neighboring to the subject pixel, the modified density being calculated, if the subject pixel has the density different from the maximum density, through adding the density of the subject pixel with the fractional portions of errors distributed from the already-processed pixels neighboring to the subject pixel;

(d) comparing the modified density with a predetermined threshold value;

(e) compulsively converting the subject pixel into the second binary value regardless of the compared result when the subject pixel has the maximum density, converting the subject pixel into the first binary value when the subject pixel has the density different from the maximum density and when the modified density is smaller than the threshold value, and converting the subject pixel into the second binary value when the subject pixel has the density different from the maximum density and when the modified density is equal to or greater than the threshold value;

(f) calculating a conversion error to be distributed from the subject pixel to pixels neighboring to the subject pixels, the conversion error being calculated as equal to the modified density when the modified density is smaller than the threshold value, the conversion error being calculated as a value obtained through subtracting the maximum value from the modified density when the modified density is equal to or greater than the threshold value and when the subject pixel has the density different from the maximum density, the conversion error being calculated as equal to a value obtained through subtracting a value Y from the modified density when the modified density is equal to or greater than the threshold value and when the subject pixel has the maximum density, the value Y being greater than the second imaginary density and being equal to or smaller than the maximum value; and (g) repeating the steps (a) through (f) for each of all the pixels within the continuous tone image, thereby producing the pseudo-halftone image.

6. A method as claimed in claim 1, wherein all the pixels of the continuous tone image are successively subjected to the error-distributing binary conversion process, while each minimum density pixel being compulsively converted into the first binary value and the conversion error, to be distributed from the minimum density pixel to its neighboring pixels, being calculated through using the first imaginary density as the density value for the minimum density pixel, and while each maximum density pixel being compulsively converted into the second binary value and a conversion error, to be distributed from the maximum density pixel to its neighboring pixels, being calculated through using the second imaginary density as the density value for the maximum density pixel.

7. A method as claimed in claim 6, wherein the error-distributing binary conversion step includes the step of:

(a) judging whether or not a pixel to be processed to the error-distributing binary conversion process has the minimum density, the maximum density, or another value different from the minimum density and the maximum density;

(b) setting the first imaginary density when the subject pixel has the minimum density, and setting the second imaginary density when the subject pixel has the maximum density;

(c) calculating a modified density for the subject pixel, the modified density being calculated, if the subject pixel has the minimum density, through adding the first imaginary density with fractional portions of errors distributed from already-processed pixels neighboring to the subject pixel, the modified density being calculated, if the subject pixel has the maximum density, through adding the second imaginary density with the fractional portions of errors distributed from already-processed pixels neighboring to the subject pixel, the modified density being calculated, if the subject pixel has the density different from the minimum density and the maximum density, through adding the density of the subject pixel with the fractional portions of errors distributed from the already-processed pixels neighboring to the subject pixel;

(d) comparing the modified density with a predetermined threshold value;

(e) compulsively converting the subject pixel into the first binary value regardless of the compared result when the subject pixel has the minimum density, compulsively converting the subject pixel into the second binary value regardless of the compared result when the subject pixel has the maximum density, converting the subject pixel into the first binary value when the subject pixel has the density different from the minimum density and the maximum density and when the modified density is smaller than the threshold value, and converting the subject pixel into the second binary value when the subject pixel has the density different from the minimum density and the maximum density and when the modified density is equal to or greater than the threshold value;

(f) calculating a conversion error to be distributed from the subject pixel to pixels neighboring to the subject pixel, the conversion error being calculated as equal to the modified density when the modified density is smaller than the threshold value, the conversion error being calculated as a value obtained through subtracting the maximum density from the modified density when the modified density is equal to or greater than the threshold value and when the subject pixel has the density different from the minimum density and the maximum density, the conversion error being calculated as equal to a value obtained through subtracting a value X from the modified density when the modified density is equal to or greater than the threshold value and when the subject pixel has the minimum density, the value X being greater than the first imaginary density and being equal to or smaller than the maximum density, the conversion error being calculated as equal to a value obtained through subtracting a value Y from the modified density when the modified density is equal to or greater than the threshold value and when the subject pixel has the maximum density, the value Y being greater than the second imaginary density and being equal to or smaller than the maximum density; and (g) repeating the steps (a) through (f) for each of all the pixels within the continuous tone image, thereby producing the pseudo-halftone image.

8. A method as claimed in claim 7, wherein the first imaginary density is lower than the second imaginary density.

9. A method as claimed in claim 7, wherein the error-distributing binary conversion step further includes the steps of:

distributing fractions of the calculated conversion error to unprocessed neighboring pixels according to a predetermined weighting manner; and accumulating, in an error buffer prepared for each of the unprocessed neighboring pixels, the corresponding fraction of the calculated conversion error with already-accumulated fractions of conversion errors distributed from the already-processed pixels.

10. A method as claimed in claim 9, wherein the modified density calculating step (c) includes the step of retrieving, from the error buffer prepared for the subject pixel, accumulated fractions of the conversion errors distributed from the already-converted pixels neighboring to the subject pixel.

11. A method as claimed in claim 7, wherein the modified density calculating step (c) includes the step of determining, at a predetermined weighting manner, a sum of the fractions of the conversion errors to be distributed to the subject pixel from the already-processed pixels neighboring to the subject pixel.

12. A method as claimed in claim 11, wherein the error-distributing binary conversion step further includes the step of storing the conversion error calculated for the subject pixel in an error buffer for the subject pixel.

13. A method as claimed in claim 11, wherein the error-distributing binary conversion step further includes the steps of:

distributing fractions of the calculated conversion error to the neighboring pixels according to a predetermined weighting manner; and accumulating, in an error buffer prepared for each of the neighboring pixels, the corresponding fraction of the calculated conversion error with already-accumulated fractions of conversion errors distributed from the already-processed pixels.

14. A method as claimed in claim 13, wherein the error fraction distributing process distributes fractions of the calculated conversion error to unprocessed neighboring pixels according to the predetermined weighting manner, the accumulating process accumulating, in an error buffer prepared for each of the unprocessed neighboring pixels, the corresponding fraction of the calculated conversion error with already-accumulated fractions of conversion errors distributed from the already-processed pixels.

15. A method as claimed in claim 13, wherein the error fraction distributing process distributes fractions of the calculated conversion error to already-processed neighboring pixels according to the predetermined weighting manner, the accumulating process accumulating, in an error buffer prepared for each of the already-processed neighboring pixels, the corresponding fraction of the calculated conversion error with already-accumulated fractions of conversion errors distributed from the already-processed pixels.

16. A method as claimed in claim 13, wherein the error fraction distributing process distributes a fraction of the calculated conversion error to the subject pixel according to the predetermined weighting manner, the accumulating process accumulating, in an error buffer prepared for the subject pixel, the corresponding fraction of the calculated conversion error with already-accumulated fractions of conversion errors distributed from the already-processed pixels.

17. A method as claimed in claim 7, wherein the minimum density is equal to zero (0), and the first imaginary density is in a range of one (1) to a value obtained by dividing the maximum density by a value of sixteen (16).

18. A method as claimed in claim 7, wherein the imaginary density setting step (b) sets a random value as the first imaginary density, the random values set for all the minimum density pixels in the continuous tone image having an average greater than the minimum value.

19. A method as claimed in claim 18, wherein while the minimum density pixels are successively processed to the error-distributing binary conversion step, values are randomly set as the first imaginary densities for the minimum density pixels.

20. A method as claimed in claim 7, further comprising the step of preparing in advance a first array of values, whose average being greater than the minimum density, the imaginary density setting step (b) selects one value, from the first array of values, when the subject pixel has the minimum density.

21. A method as claimed in claim 20, wherein while the minimum density pixels in the continuous tone image are successively processed to the error-distributing conversion step, the values are successively selected from the first value array in a predetermined order and are set as the first imaginary densities for the maximum density pixels.

22. A method as claimed in claim 7, wherein the imaginary density setting step (b) sets a random value as the second imaginary density, the random values set for all the maximum density pixels in the continuous tone image having an average smaller than the maximum value.

23. A method as claimed in claim 22, wherein while the maximum density pixels are successively processed to the error-distributing binary conversion step, values are randomly set as the second imaginary densities for the maximum density pixels.

24. A method as claimed in claim 7, further comprising the step of preparing in advance a second array of values, whose average being smaller than the maximum density, the imaginary density setting step (b) selects one value, from the second array of values, when the subject pixel has the maximum density.

25. A method as claimed in claim 24, wherein while the maximum density pixels in the continuous tone image are successively processed to the error-distributing conversion step, the values are successively selected from the second value array in a predetermined order and are set as the second imaginary densities for the maximum density pixels.

26. A method as claimed in claim 7, wherein the minimum density is equal to zero (0), the maximum density is equal to 255, and the first imaginary density is in a range of 1 to 16.

27. A method as claimed in claim 7, wherein the value X is equal to the maximum density.

28. A method as claimed in claim 7, wherein the minimum density is equal to zero (0), and the second imaginary density is in a range between a value obtained by subtracting one (1) from the maximum density and a value obtained by subtracting, from the maximum density, a value obtained by dividing the maximum density by sixteen (16).

29. A method as claimed in claim 7, wherein the minimum density is equal to zero (0), the maximum density is equal to 255, and the second imaginary density is in a range of 239 to 254.

30. A method as claimed in claim 7, wherein the value Y is equal to the maximum density.

31. A device for converting a continuous tone image into a pseudo-halftone image, the device comprising:

means for receiving data of a continuous tone image desired to be converted into a pseudo-halftone image, the continuous tone image having a plurality of pixels, each pixel having one density value defined in a range between a predetermined minimum density and a predetermined maximum density; and means for subjecting all the pixels of the continuous tone image to an error-distributing binary conversion process on a pixel by pixel basis, to thereby convert the density values of the pixels into binary values while calculating conversion errors and distributing the calculated conversion errors to neighboring pixels, while performing at least one of a first compulsive converting process and a second compulsive converting process, the first compulsive converting process being for compulsively converting a minimum density pixel that has the minimum density into a first binary value and calculating a conversion error, to be distributed from the minimum density pixel to its neighboring pixels, through using a first imaginary density, greater than the minimum density, as the density value for the minimum density pixel, the second compulsive converting process being for compulsively converting a maximum density pixel that has the maximum density into a second binary value and calculating a conversion error, to be distributed from the maximum density pixel to its neighboring pixels, through using a second imaginary density, smaller than the maximum density, as the density value for the maximum density pixel.

32. A device as claimed in claim 31, wherein the conversion process means successively subjects all the pixels of the continuous tone image to the error-distributing binary conversion process, while compulsively converting each minimum density pixel into the first binary value and calculating the conversion error, to be distributed from the minimum density pixel to its neighboring pixels, through using the first imaginary density as the density value for the minimum density pixel, and while compulsively converting each maximum density pixel into the second binary value and calculating a conversion error, to be distributed from the maximum density pixel to its neighboring pixels, through using the second imaginary density as the density value for the maximum density pixel.

33. A device as claimed in claim 32, wherein the conversion process means includes:

(a) means for judging whether or not a pixel to be processed to the error-distributing binary conversion process has the minimum density, the maximum density, or another value different from the minimum density and the maximum density;

(b) means for setting the first imaginary density when the subject pixel has the minimum density, and setting the second imaginary density when the subject pixel has the maximum density;

(c) means for calculating a modified density for the subject pixel, the modified density calculating means calculating the modified density, if the subject pixel has the minimum density, through adding the first imaginary density with fractional portions of errors distributed from already-processed pixels neighboring to the subject pixel, the modified density calculating means calculating the modified density, if the subject pixel has the maximum density, through adding the second imaginary density with the fractional portions of errors distributed from already-processed pixels neighboring to the subject pixel, the modified density calculating means calculating the modified density, if the subject pixel has the density different from the minimum density and the maximum density, through adding the density of the subject pixel with the fractional portions of errors distributed from the already-processed pixels neighboring to the subject pixel;

(d) means for comparing the modified density with a predetermined threshold value;

(e) means for compulsively converting the subject pixel into the first binary value regardless of the compared result when the subject pixel has the minimum density, for compulsively converting the subject pixel into the second binary value regardless of the compared result when the subject pixel has the maximum density, for converting the subject pixel into the first binary value when the subject pixel has the density different from the minimum density and the maximum density and when the modified density is smaller than the threshold value, and for converting the subject pixel into the second binary value when the subject pixel has the density different from the minimum density and the maximum density and when the modified density is equal to or greater than the threshold value;

(f) means for calculating a conversion error to be distributed from the subject pixel to pixels neighboring to the subject pixel, the conversion error calculating means calculating the conversion error as equal to the modified density when the modified density is smaller than the threshold value, the conversion error calculating means calculating the conversion error as a value obtained through subtracting the maximum density from the modified density when the modified density is equal to or greater than the threshold value and when the subject pixel has the density different from the minimum density and the maximum density, the conversion error calculating means calculating the conversion error as equal to a value obtained through subtracting a value X from the modified density when the modified density is equal to or greater than the threshold value and when the subject pixel has the minimum density, the value X being greater than the first imaginary density and being equal to or smaller than the maximum density, the conversion error calculating means calculating the conversion error as equal to a value obtained through subtracting a value Y from the modified density when the modified density is equal to or greater than the threshold value and when the subject pixel has the maximum density, the value Y being greater than the second imaginary density and being equal to or smaller than the maximum density; and (g) control means for controlling the means (a) through (f) to perform operation onto each of all the pixels within the continuous tone image, thereby producing the pseudo-halftone image.

34. A device for converting a continuous tone image into a pseudo-halftone image, the device comprising:

an input conversion portion for receiving input density representing each pixel of the continuous tone image to be converted, the input density being defined in a density range between a minimum density and a maximum density, for judging whether or not the input density is equal to the minimum density or the maximum density, for issuing a first compulsive command to output a first binary value when the input density is judged to be the minimum density and issuing a second compulsive command to output a second binary value when the input density is judged to be the maximum density, for outputting the input density as a density value when the input density is different from the minimum density and the maximum density, for outputting a first imaginary density, greater than the minimum density, as the density value when the input density is equal to the minimum density, and for outputting a second imaginary density, smaller than the maximum density, as the density value when the input density is equal to the maximum density;

an input modification portion for calculating a modified density for a subject pixel through adding the density value inputted from the input conversion portion with conversion errors distributed to the subject pixel from already-processed pixels, and for outputting the modified density;

a binary conversion portion for comparing the modified density value, inputted from the input modification portion, with a predetermined threshold value, the binary conversion portion issuing a first instruction to output a first binary value if the modified density value is smaller than the threshold value and issuing a second instruction to output a second binary value if the modified density value is greater than or equal to the threshold value;

an output conversion portion capable of receiving the first and second compulsive commands from the input conversion portion and capable of receiving the first and second instructions from the binary conversion portion, the output conversion portion outputting the first binary value in response to the first compulsive command regardless of the instruction received from the binary conversion portion, the output conversion portion outputting the second binary value in response to the second compulsive command regardless of the instruction received from the binary conversion portion, the output conversion portion outputting the first binary value when receiving the first instruction and when receiving no compulsive commands from the input conversion portion, the output conversion portion outputting the second binary value when receiving the second instruction and when receiving no compulsive commands from the input conversion portion; and a binary error generating portion for receiving the modified density value from the input modification portion and for receiving the instruction issued from the binary conversion portion, the binary error generating portion calculating a conversion error as equal to the modified density value when receiving the first instruction and calculating a conversion error through subtracting the maximum density from the modified density value when receiving the second instruction.

35. A device as claimed in claim 34, wherein the binary conversion error generating portion further receives the compulsive command from the input conversion portion, the binary error generating portion calculating a conversion error through subtracting a value X from the modified density value when receiving the second instruction from the binary conversion portion and receiving the first compulsive command from the input conversion portion, the value X being greater than the first imaginary density and equal to or smaller than the maximum density, the binary error generating portion calculating a conversion error through subtracting a value Y from the modified density value when receiving the second instruction from the binary conversion portion and receiving the second compulsive command from the input conversion portion, the value Y being greater than the second imaginary density and equal to or smaller than the maximum density.

36. A device as claimed in claim 34, further comprising:

an error distribution portion for distributing fractional portions of the conversion error, calculated by the binary error generating portion, to neighboring pixels not yet processed with using a predetermined weighting manner; and an error storage portion for accumulating each fractional portion of the conventional error, distributed to the corresponding neighboring pixel, with already-accumulated fractional portions of conversion errors distributed to the corresponding neighboring pixel from already-processed pixels, the input modification portion retrieving the fractional portions of conversion errors accumulated in the error storage portion for the subject pixel and calculating the modified density value.

37. A device as claimed in claim 34, further comprising an error storage portion for storing the conversion error calculated by the binary error generating portion for the subject pixel.

38. A device as claimed in claim 37, wherein the input modification portion retrieves the conversion errors stored in the error storage portion for the already-processed neighboring pixels for the subject pixel, and determines the amount of the conversion errors to be distributed to the subject pixel.

39. A device as claimed in claim 38, wherein the error storage portion distributes fractional portions of the conversion error, calculated by the binary error generating portion, to neighboring pixels with using a predetermined weighting manner and accumulates each fractional portion of the conversion error, distributed to the corresponding neighboring pixel, with already-accumulated fractional portions of conversion errors distributed to the corresponding neighboring pixel from already-processed pixels.

40. A device as claimed in claim 38, wherein the error storage portion distributes fractional portions of the conversion error, calculated by the binary error generating portion, to neighboring unprocessed pixels with using the predetermined weighting manner and accumulates each fractional portion of the conversion error, distributed to the corresponding neighboring unprocessed pixel, with already-accumulated fractional portions of conversion errors distributed to the corresponding neighboring unprocessed pixel from already-processed pixels.

41. A device as claimed in claim 38, wherein the error storage portion distributes fractional portions of the conversion error, calculated by the binary error generating portion, to already-processed neighboring pixels with using the predetermined weighting manner and accumulates each fractional portion of the conversion error, distributed to the corresponding already-processed neighboring pixel, with already-accumulated fractional portions of conversion errors distributed to the corresponding already-processed neighboring pixel from already-processed pixels.

42. A device as claimed in claim 38, wherein the error storage portion distributes fractional portions of the conversion error, calculated by the binary error generating portion, to the subject pixel with using the predetermined weighting manner and accumulates the fractional portion of the conversion error, distributed to the subject pixel, with already-accumulated fractional portions of conversion errors distributed to the subject pixel from already-processed pixels.

43. A program storage medium capable of being read by a computer, the program comprising:

a program of receiving data of a continuous tone image desired to be converted into a pseudo-halftone image, the continuous tone image having a plurality of pixels, each pixel having one density value defined in a range between a predetermined minimum density and a predetermined maximum density; and a program of subjecting all the pixels of the continuous tone image to an error-distributing binary conversion process on a pixel by pixel basis, to thereby convert the density values of the pixels into binary values while calculating conversion errors and distributing the calculated conversion errors to neighboring pixels, while performing at least one of a first compulsive converting process and a second compulsive converting process, the first compulsive converting process being for compulsively converting a minimum density pixel that has the minimum density into a first binary value and calculating a conversion error, to be distributed from the minimum density pixel to its neighboring pixels, through using a first imaginary density, greater than the minimum density, as the density value for the minimum density pixel, the second compulsive converting process being for compulsively converting a maximum density pixel that has the maximum density into a second binary value and calculating a conversion error, to be distributed from the maximum density pixel to its neighboring pixels, through using a second imaginary density, smaller than the maximum density, as the density value for the maximum density pixel.

* * * * *